United States Patent
Dimou et al.

(10) Patent No.: US 12,388,517 B2
(45) Date of Patent: Aug. 12, 2025

(54) USER EQUIPMENT UPLINK BEAM SWEEPING BASED ON A TRIGGER RULE

(71) Applicant: QUALCOMM Incorporated, San Diego, CA (US)

(72) Inventors: Konstantinos Dimou, New York City, NY (US); Yan Zhou, San Diego, CA (US); Tao Luo, San Diego, CA (US); Peter Gaal, San Diego, CA (US); Juan Montojo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/905,146

(22) PCT Filed: Apr. 6, 2021

(86) PCT No.: PCT/US2021/026023
§ 371 (c)(1),
(2) Date: Aug. 26, 2022

(87) PCT Pub. No.: WO2021/207250
PCT Pub. Date: Oct. 14, 2021

(65) Prior Publication Data
US 2023/0284038 A1    Sep. 7, 2023

(30) Foreign Application Priority Data
Apr. 7, 2020    (GR) ............................ 20200100178

(51) Int. Cl.
*H04W 16/28*    (2009.01)
*H04L 5/00*    (2006.01)
*H04W 24/10*    (2009.01)

(52) U.S. Cl.
CPC .......... *H04W 16/28* (2013.01); *H04L 5/0051* (2013.01); *H04W 24/10* (2013.01)

(58) Field of Classification Search
CPC .................................................. H04B 7/06952
See application file for complete search history.

(56) References Cited

U.S. PATENT DOCUMENTS

2017/0373731 A1 * 12/2017 Guo ..................... H04B 7/0404
2019/0261195 A1    8/2019 Cheng et al.
(Continued)

FOREIGN PATENT DOCUMENTS

| CN | 109257754 A | 1/2019 |
| EP | 3261269 A1 | 12/2017 |
| WO | 2019214611 A1 | 11/2019 |

OTHER PUBLICATIONS

3GPP Technical Report 21.915 version 15.0.0, titled Digital cellular telecommunications system (Phase 2+) (GSM); Universal Mobile Telecommunications System (UMTS); LTE; 5G; Release description; (Year: 2019).*

(Continued)

*Primary Examiner* — Ayaz R Sheikh
*Assistant Examiner* — Christopher R Davis
(74) *Attorney, Agent, or Firm* — ArentFox Schiff LLP

(57) ABSTRACT

A user equipment (UE) of a wireless communication network receives conditions for sweeping beams between a base station of the network and the UE. The conditions include a beam sweeping trigger rule, and a beam measurement configuration for measuring at least one characteristic of each of the beams on downlink. The UR measures at least one characteristic of each of the beams in accordance with the measurement configuration. After the measuring, the UE detects a trigger in accordance with the trigger rule. In (Continued)

response to detecting the trigger, the UE sweeps the beams on uplink based on the measuring.

26 Claims, 25 Drawing Sheets

(56) References Cited

U.S. PATENT DOCUMENTS

| | | |
|---|---|---|
| 2020/0007196 A1 | 1/2020 | Cao |
| 2020/0059398 A1* | 2/2020 | Pan .................. H04W 72/21 |
| 2021/0058999 A1 | 2/2021 | Chen et al. |
| 2022/0103220 A1* | 3/2022 | Zander ............. H04B 7/0695 |

OTHER PUBLICATIONS

3GPP Technical Report 38.802 version 14.1.0, titled 3rd Generation Partnership Project; Technical Specification Group Radio Access Network; Study on New Radio Access Technology Physical Layer Aspects (Year: 2017).*

3rd Generation Partnership Project Technical Specification 38.331 version 15.8.0 Release 15, titled â5G; NR; Radio Resource Control (RRC); Protocol specification (Year: 2020).*

International Search Report and Written Opinion—PCT/US2021/026023—ISAEPO—Jul. 5, 2021.

* cited by examiner

USER EQUIPMENT UPLINK BEAM SWEEPING BASED ON A TRIGGER RULE

CROSS REFERENCE TO RELATED APPLICATIONS

This application is a National Phase entry of PCT Application No. PCT/US2021/026023, entitled "BEAM SWEEPING" and filed on Apr. 6, 2021, which claims priority of Greek application Ser. No. 20200100178, entitled "BEAM SWEEPING" and filed on Apr. 7, 2020, both of which are expressly incorporated by reference herein in their entirety.

BACKGROUND

Technical Field

The present disclosure relates generally to communication systems, and more particularly in some examples, to control of beam sweeping across beams of a channel between user equipment (UE) of a wireless communication network and a base station of the network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes method, apparatus, and computer-readable media including instructions for wireless communication. In such technology, a UE receives conditions for sweeping beams between a base station of the network and the UE. The conditions include a beam sweeping trigger rule, and a beam measurement configuration for measuring at least one characteristic of each of the beams on downlink. The UE measures at least one characteristic of each of the beams in accordance with the measurement configuration. After the measuring, the UE detects a trigger in accordance with the trigger rule. In response to detecting the trigger, the UE sweeps the beams on uplink based on the measuring.

In some examples, the base station first transmits, to a UE, conditions for sweeping beams between the UE and the base station. The conditions include a beam sweeping trigger rule, and a beam measurement configuration for measuring at least one characteristic of each of the beams on downlink. The base station second transmits, by the base station after the first transmitting, a reference signal over the beams on downlink. The base station receives, in response to the first and second transmitting and from the UE, downlink beam measurements in accordance with the beam measurement configuration. The base station prepares, in response to the receiving, at least one beam not currently used in downlink. The base station also receives, on at least one of the prepared beams swept by the UE, an indication that a trigger has been detected at the UE in accordance with the trigger rule. The base station then transmits at least one physical channel on at least one prepared beam to the UE.

In some examples, the base station transmits, to a UE of the network, a beam sweeping configuration specifying a reference signal. The base station measures at least one characteristic of each of a plurality of beams of a physical channel, each of the beams comprising the specified reference signal, from the UE to the base station on uplink. The measured beams include each beam currently in use for communication between the base station and the UE and a plurality of beams not currently in use for downlink data transfer to the UE. The base station detects, after the measuring, a beam sweeping trigger condition. The base station sweeps, in response to the detecting, a plurality of the measured beams on downlink to the UE based on the measuring and the configuration.

In some examples, the UE receives, from a base station, a beam sweeping configuration specifying a reference signal. The UE transmits, on each of a plurality of beams of a physical channel, the specified reference signal to the base station. The beams include each beam currently in use for data transfer between the base station and the UE and a plurality of beams not currently in use for data transfer to the UE from the base station. The UE receives a plurality of the transmitted beams swept on downlink to the UE, based on the measuring and the configuration, for use in downlink data transfer from the base station to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
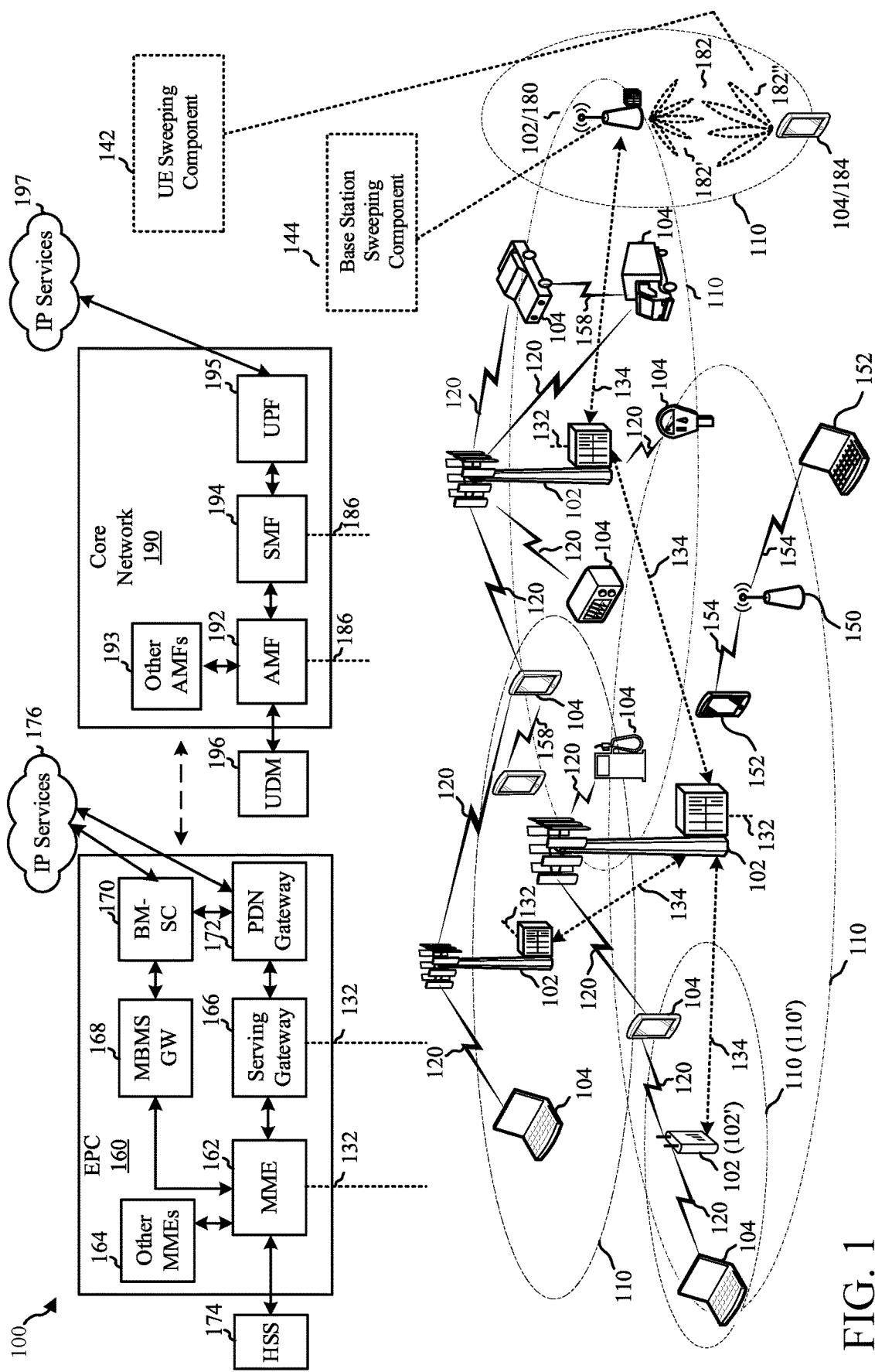
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

In some frequency ranges, for example the "millimeter wave" (mmW) range of 5G, radio waves are more susceptible to blockage and interference compared to the low frequency waves that operate in earlier wireless communication systems. That means mmWs may easily be disrupted/blocked—for instance, by the hand or head of someone using a UE. Use cases for 5G NR such as mMTC and URLLC may use beam diversity/redundancy in the physical channels between base stations and UEs to address the possibility of blocking while maintaining the quality of service expected of those use cases.

This approach, while generally effective, can still be less effective than desired under certain circumstances. For example, where a mmW downlink transmission between a 5G base station and a 5G UE is blocked, the UE can eventually declare beam failure or radio link failure and issue a new random-access request to the network. However, the random-access process may require dozens of one millisecond cycles to complete—a delay much too long for 5G usage scenarios such as mMTC and URLLC.

In aspects of the present disclosure, methods, non-transitory computer readable media, and apparatuses are provided. In some examples of the technology disclosed herein, a UE receives conditions for sweeping beams between a base station of the network and the UE. The conditions include a beam sweeping trigger rule, and a beam measurement configuration for measuring at least one characteristic of each of the beams on downlink. The UE measures at least one characteristic of each of the beams in accordance with the measurement configuration. After the measuring, the UE detects a trigger in accordance with the trigger rule. In response to detecting the trigger, the UE sweeps the beams on uplink based on the measuring.

In some aspects, the base station first transmits, to a UE, conditions for sweeping beams between the UE and the base station. The conditions include a beam sweeping trigger rule, and a beam measurement configuration for measuring at least one characteristic of each of the beams on downlink. The base station second transmits, by the base station after the first transmitting, a reference signal over the beams on downlink. The base station receives, in response to the first and second transmitting and from the UE, downlink beam measurements in accordance with the beam measurement configuration. The base station prepares, in response to the receiving, at least one beam not currently used in downlink.

The base station also receives, on at least one of the prepared beams swept by the UE, an indication that a trigger has been detected at the UE in accordance with the trigger rule. The base station then transmits at least one physical channel on at least one prepared beam to the UE.

In some aspects, the base station transmits, to a UE of the network, a beam sweeping configuration specifying a reference signal. The base station measures at least one characteristic of each of a plurality of beams of a physical channel, each of the beams comprising the specified reference signal, from the UE to the base station on uplink. The beams measured beams including each beam currently in use for communication between the base station and the UE and a plurality of beams not currently in use for downlink data transfer to the UE. The base station detects, after the measuring, a beam sweeping trigger condition. The base station sweeps, in response to the detecting, a plurality of the measured beams on downlink to the UE based on the measuring and the configuration.

In some aspects, the UE receives, from a base station, a beam sweeping configuration specifying a reference signal. The UE transmits, on each of a plurality of beams of a physical channel, the specified reference signal to the base station. The beams include each beam currently in use for data transfer between the base station and the UE and a plurality of beams not currently in use for data transfer to the UE from the base station. The UE receives a plurality of the transmitted beams swept on downlink to the UE, based on the measuring and the configuration, for use in downlink data transfer from the base station to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH), described further infra, on the DL and can carry multiple copies of a Physical Uplink Control Channel (PUCCH), also described further infra, on the UL.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range—making mmW transmissions susceptible to blocking and attenuation resulting in, e.g., unsuccessfully decoded data. The mmW base station 180 may utilize beamforming 182 with the UE 104/184 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Continuing to refer to FIG. 1, in certain aspects, the UE 104 is configured, e.g., through information elements (IEs) from the base station 102, to sweep UL beams 182" between the UE 104 and the base station 102 in response to detecting a trigger. Such configuration includes configuring the UE 104 with a rule specifying the trigger conditions and configuring the UE 104 to measure DL beams 182' from the base station 102 and to report the measurement to the base station 102 prior to the detecting. Also prior to the detecting, the UE 104 begins to receive prepared beams from the base station 102 (based on the measuring) on DL beams 182' not currently used for DL data transfer. After sweeping, the UE 104 begins to receive DL transmissions on one or more DL beams 182' based on the swept UL beams 182" that were successfully received by the base station 102. The UE 104 can use UE Sweeping Component 142 for performing this configuration, measurement, and sweeping.

In similar aspects, the base station 102 transmits IEs to the UE 104 on active DL beams 182' for the configuration described above. The base station 102 then transmits a reference signal, e.g., channel state information reference signals (CSI-RS), over each of the DL beams 182' to be measured by the UE 104. Upon receiving measurements of each DL beam 182' from the UE 104 over one or more uplink beams 182", the base station 102 may prepare certain of the beams 182' for use, based at least in part on the measurements—for example, by transmitting a phase tracking reference signal (PTRS) on one or more DL beams 182' including DL beams 182' not currently used for DL transmission. Upon receiving an indication that a DL transmission was unsuccessful, for example by receiving a NACK from the UE 104 on one or more of the prepared beams in uplink 182", the base station 102 will switch DL transmissions to one or more of the prepared beams 182'. The base station 102 can use Base Station Sweeping Component 144 for performing this the functions described in this paragraph.

In other similar aspects, the role of sweeping entity can be switched between the base station 102 and the UE 104. In such aspects, the base station 102 transmits configuration IEs (including a measurement configuration) and instructions to the UE 104, e.g., a Sounding Reference Signal (SRS) configuration and instructions for the UE 104 to transmit the SRS across a plurality of UL beams 182". The base station 102 measures each uplink beam 182" carrying the SRS and prepares additional DL beams 182' as described above. Then, when the base station 102 detects a beam sweeping trigger condition, the base station sweeps across the prepared DL beams 182'. The base station 102 can use Base Station Sweeping Component 144 for performing this the functions described in this paragraph.

In this switched role aspect, the UE 104 receives the configuration IEs (including a measurement configuration) and instructions for the UE 104 as described above. The UE 104 then transmits the signal to be measured to the base station 102 over UL beams 182". Upon detection of a trigger condition by the base station 102 the UE 104 receives a sweep across DL beams DL beams 182'. The UE 104 then acknowledges successful reception, to the base station 102, on UL beams 182" where the UE 104 successfully received the sweep. After sweeping, the UE 104 begins to receive DL transmissions on one or more DL beams 182' based on the swept DL beams 182' that were successfully acknowledged to the base station 102.

Although the following description may be focused on 5G NR, the concepts described herein may be applicable to other similar areas, such as LTE, LTE-A, CDMA, GSM, and other wireless technologies.

Figure 2A:
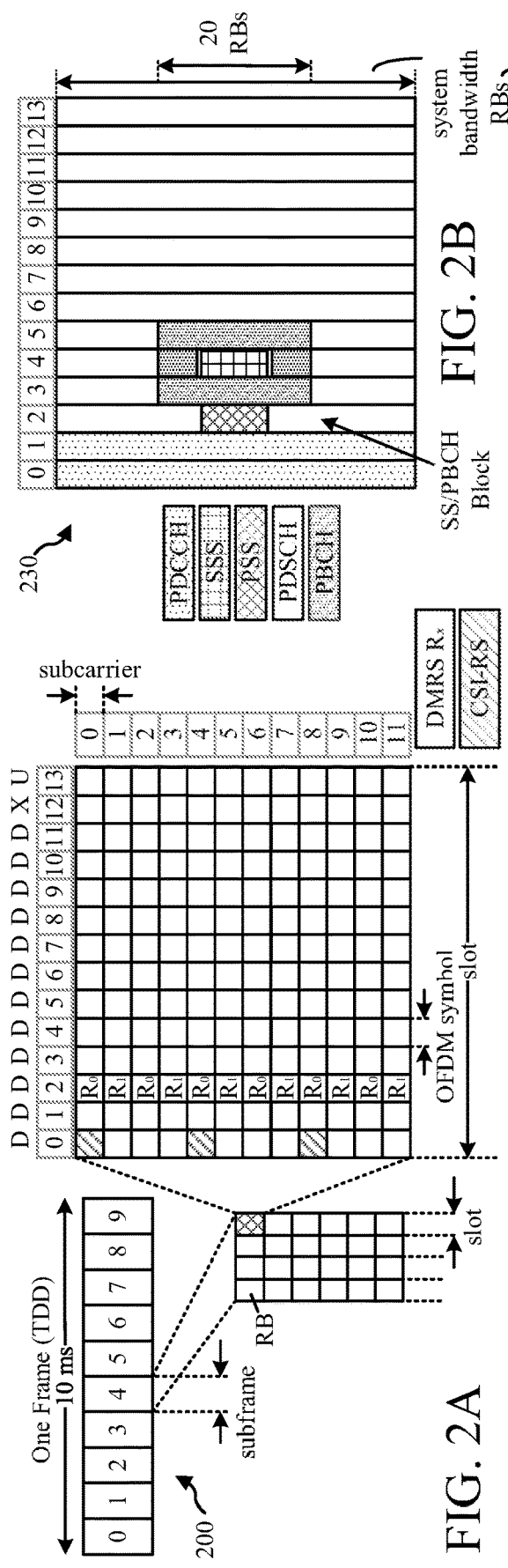
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
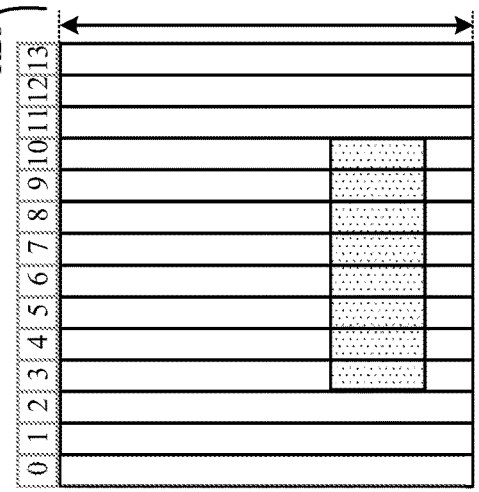
Figure 2C:
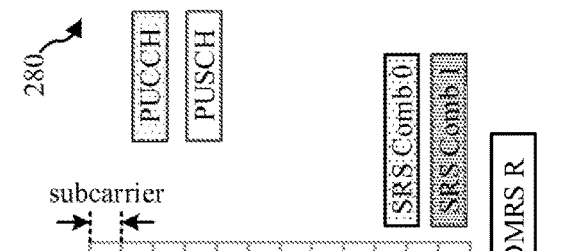
Figure 2D:
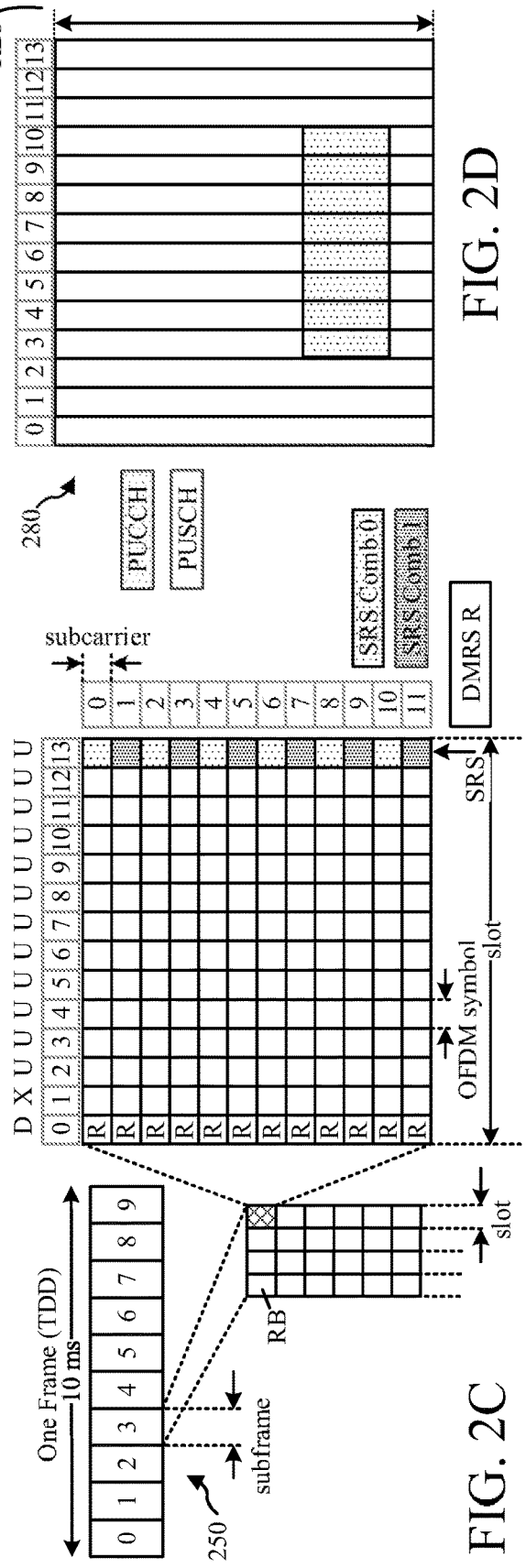

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The sub-carrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
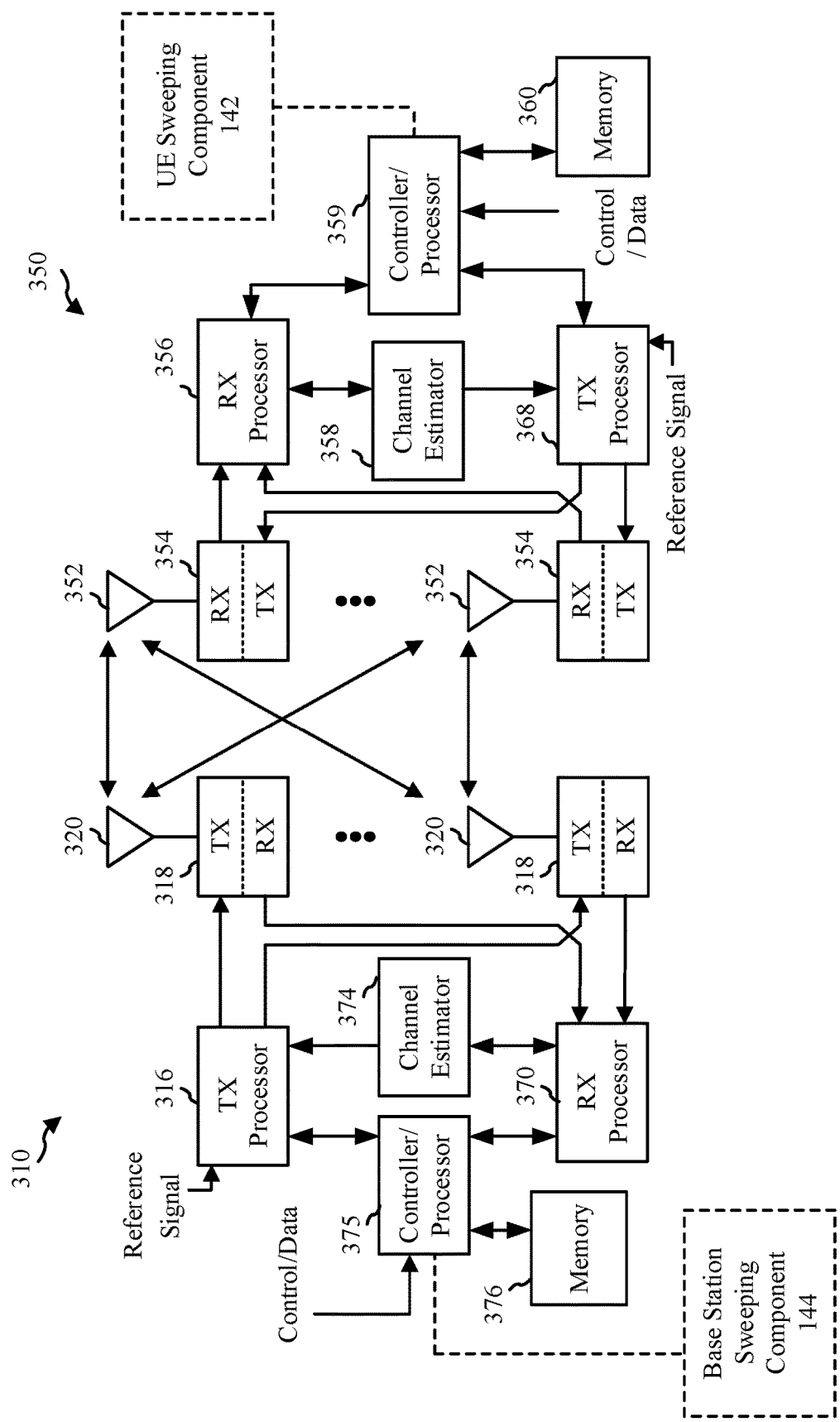
FIG. 3 is a diagram illustrating a base station and user equipment (UE) in an access network, in accordance with examples of the technology disclosed herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Continuing to refer to FIG. 3, and continuing to refer to prior figures for context, in certain aspects, the UE 350 is configured, e.g., through information elements (IEs) from the base station 310 using controller processor 359, to sweep UL beams 182" (e.g., using TX354s under control of TX processor 368) between the UE 350 and the base station 310 in response to detecting a trigger (e.g., using controller/processor 359). Such configuration includes configuring the UE 350 (e.g., using RX processor 356 and/or controller processor 359) with a rule specifying the trigger conditions and configuring the UE to measure DL beams 182' from the base station 310 (e.g., using 350 channel estimator 358) and to report (e.g., using TX354s and TX processor 368) the measurement to the base station 310 prior to the detecting. Also prior to the detecting, the UE 350 begins to receive prepared beams (e.g., using one or more RX354 and RX processor 356) from the base station 310 (based on the measuring) on DL beams 182' not currently used for DL data transfer. After sweeping, the UE 350 begins to receive DL transmissions on one or more DL beams 182' (e.g., using one or more RX354 and RX processor 356) based on the swept UL beams 182" that were successfully received by the base station 310.

In similar aspects, the base station 310 transmits (e.g., using TX318s under control of TX processor 316) IEs to the UE 350 on active DL beams 182' for the configuration described above. The base station 310 then transmits (e.g., using TX318s under control of TX processor 316) a reference signal, e.g., channel state information reference signals (CSI-RS), over each of the DL beams 182' to be measured by the UE 350. Upon receiving (e.g., using RX318s under control of RX processor 370) measurements of each DL beam 182' from the UE 104 over one or more uplink beams 182", the base station 310 may prepare (e.g., using TX318s under control of TX processor 316) certain of the beams 182' for use, based at least in part on the measurements—for example, by transmitting (e.g., using TX318s under control of TX processor 316) a phase tracking reference signal (PTRS) on one or more DL beams 182' including DL beams 182' not currently used for DL transmission. Upon receiving (e.g., using RX318s under control of RX processor 370) an indication that a DL transmission was unsuccessful, for example by receiving (e.g., using TX318s under control of TX processor 316) a NACK from the UE 104 on one or more of the prepared beams in uplink 182", the base station 310 will switch (e.g., using TX318s under control of TX processor 316) DL transmissions to one or more of the prepared beams 182'.

In other similar aspects, the role of sweeping entity can be switched between the base station 310 and the UE 350. In such aspects, the base station 310 transmits (e.g., using TX318s under control of TX processor 316) configuration IEs (including a measurement configuration) and instructions to the UE 350, e.g., a Sounding Reference Signal (SRS) configuration and instructions for the UE 350 to transmit the SRS across a plurality of UL beams 182". The base station 310 measures (e.g., using channel estimator 374) each uplink beam 182" carrying the SRS and prepares (e.g., using TX processor 316) additional DL beams 182' as described above. Then, when the base station 310 detects (e.g., using RX318s under control of RX processor 370) a beam sweeping trigger condition, the base station sweeps (e.g., using TX318s under control of TX processor 316) across the prepared DL beams 182'.

In this switched role aspect, the UE 350 receives (e.g., using RX 354s and RX processor 356) the configuration IEs (including a measurement configuration) and instructions for the UE 350 as described above. The UE 350 then transmits (using TX354s under control of TX processor 368) the signal to be measured to the base station 310 over UL beams 182". Upon detection of a trigger condition by the base station 102, the UE 104 receives (using RX 354s and RX processor 356) a sweep across DL beams DL beams 182'. The UE 350 then acknowledges (using TX354s under control of TX processor 368) successful reception, to the base station 310, on UL beams 182" where the UE 350 successfully received the sweep. After sweeping, the UE 104 begins to receive (using RX 354s and RX processor 356) DL transmissions on one or more DL beams 182' based on the swept DL beams 182' that were successfully acknowledged to the base station 310.

Figure 4:
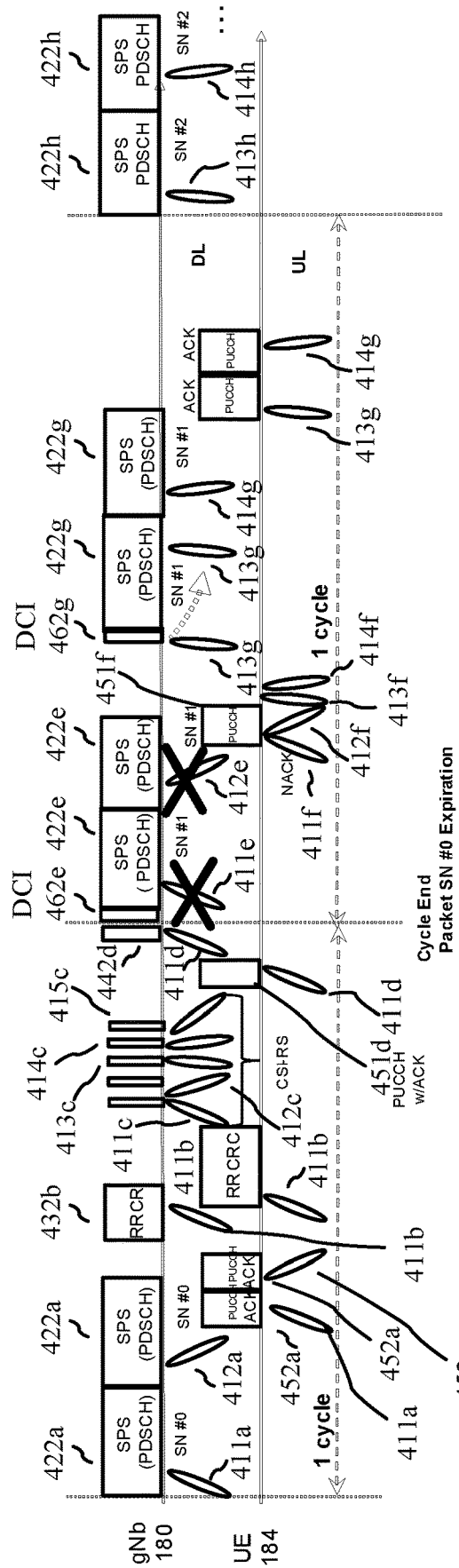
FIG. 4 is a diagram illustrating relationships between a UE and a base station for wireless communication, in accordance with examples of the technology disclosed herein.

Referring to FIG. 4, and continuing to refer to prior figures for context, a notional representation of transmissions between a base station 180 (also referred to as "gNB" in the example) and a UE 184 is shown, in accordance with examples of the technology disclosed herein. In the continuing example, the UE 184 and the gNB 180 are initially connected in an URLLC usage scenario under semi-persistent scheduling (SPS) as indicated by two copies of PDSCH 422a. One PDSCH 422a is carried on beam 411a in downlink to the UE 184, while the other PDSCH 422a is carried on beam 412a in downlink to the UE 184. The UE 184 acknowledges successful reception of each copy of PDSCH 422a by first transmitting an ACK in each of two copies of a PUCCH 452a over beams 411a and 412a in uplink.

Figure 5:
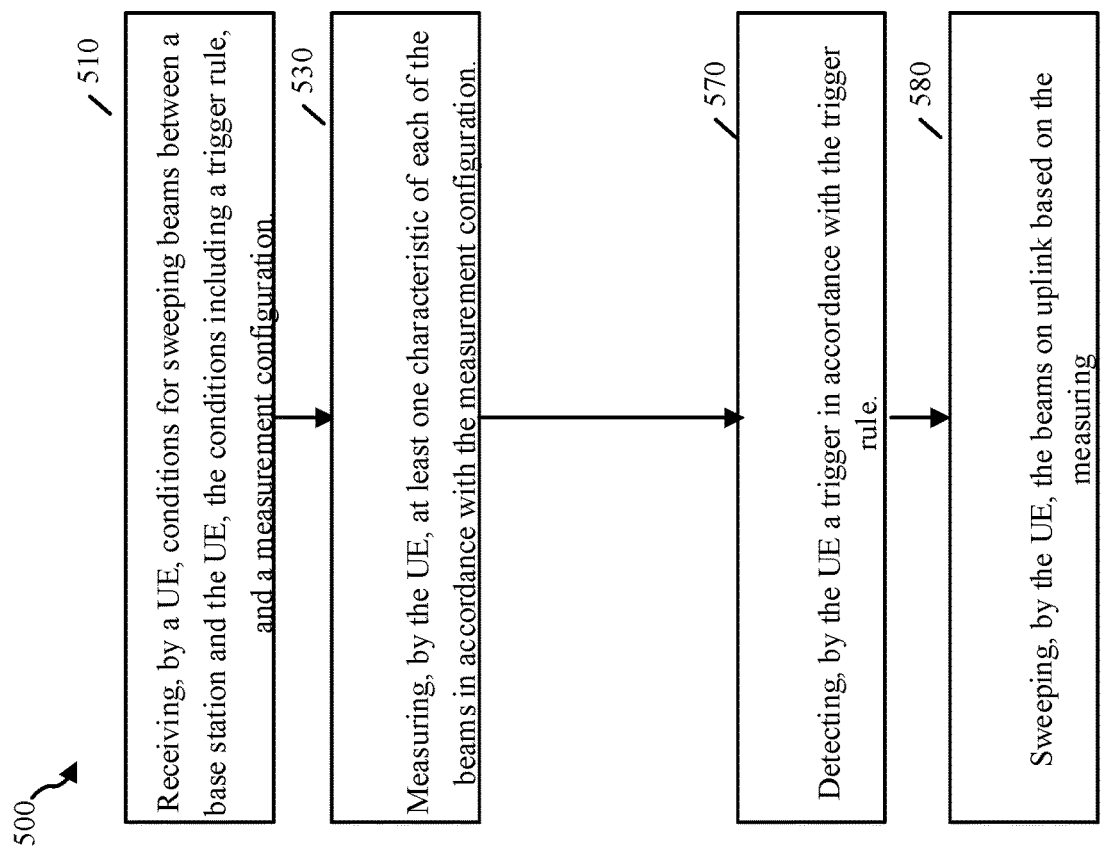
FIG. 5 is a message flow diagram of methods of wireless communication in accordance with examples of the technology disclosed herein.

Referring to FIG. 5, and continuing to refer to prior figures for context, a flowchart of methods 500 of wireless communication is shown, in accordance with examples of the technology disclosed herein. In such methods 500, a UE 184 receives conditions for sweeping beams between the base station 180 and the UE 184—Block 510. The conditions include a beam sweeping trigger rule, and a beam measurement configuration for measuring at least one characteristic of each of the beams on downlink.

In the continuing example, the trigger rule and the beam measurement configuration are carried as information element (IEs) in a Radio Resource Control-level (RRC-level) message, specifically as part of RRCReconfiguration (RRCR) 432b via beam 411b on downlink. RRCR 432b includes a CSI-MeasConfig IE, an example of which is shown in TABLE 1. In the example of TABLE 1, the conditions include a "beamSweepingUponNack" flag for DL traffic. The flag can take on the Boolean values "true" (beam sweeping enabled) and false (beam sweeping disabled). The conditions include a trigger rule that is trigged upon detecting a number K of consecutive unsuccessful receptions by the UE of a downlink transmission on a physical channel carried on the beams. In the continuing example, K can take on an integer values from 1-12. The particular value of K is determined, at least in part, on the reliability level required for the connection. The conditions also include an "Origin" designator for sweeping originated by the UE 184 and sweeping originated by the gNB 180. Note that beam sweeping by the UE takes place in the continuing example only if the "beamSweepingUponNack" flag is "true" and the "Origin" indicates "UE Originated" "UL Beam Sweeping." In the continuing example, both those conditions hold, and K=1.

TABLE 1

| CSI-MeasConfig information element |
| --- |
| --CSI-MeasConfig ::=   SEQUENCE { |
| nzp-CSI-RS-ResourceToAddModList    SEQUENCE (SIZE (1. .maxNrofNZP-CSI-RS-Resources) ) OF NZP-CSI-RS-Resource  OPTIONAL, -- Need N |
| .... |
| OPTIONAL, -- Need N              INTEGER (0 .. 6) |
| reportTriggerSize |
| OPTIONAL, -- Need M |
| aperiodicTriggerStateList           SetupRelease { CSI- |
| AperiodicTriggerStateList }              OPTIONAL, -- Need M |
| semiPersistentOnPUSCH-TriggerStateList    SetupRelease { CSI- |
| SemiPersistentOnPUSCH-TriggerStateList }   OPTIONAL, -- Need M |
| ... |
| OPTIONAL, -- Need N |
| beamSweepingUponNack (DL Traffic) : Boolean {true, false} |
| (if "beamSweepingUponNack" true, |
|     Beam Sweeping After K Nacks, K (1, 2, 3, 4, . . . , 12} |
|     Origin: {UL Beam Sweeping - UE Originated, DL Beam Sweeping - gNB Originated) |
| } |

In some examples of the technology disclosed herein, the IEs for beam sweeping can be carried in other RRC-level messages such as RRCSetup, RRCResume, and System Information Blocks (SIBs) SIB2 or SIB 3. More generally, the IEs for beam sweeping can be carried in any RRC-level message without the IEs being part of CSI-MeasConfig used here as an example—though note that CSI-MeasConfig carried IEs for beam measurement configuration, e.g., whether the measurements are taken on zero power ("zp") or non-zero power ("nzp") signals from the base station 180. Even yet more generally, the beam sweeping IEs can be carried in MAC-Control Element (MAC-CE) or DCI.

In addition, the technology disclosed herein can control a time period over which a given measurement results set remains valid for use in beam sweeping, an order of the beams for sweeping, and a number of beams to sweep. In the continuing example, the order of sweeping is the order of transmission configuration indicator (TCI) state reporting—the TCI state order already used for PDSCH or PUSCH and the strongest reported TCI states in descending order. In the continuing example, the measurement results are valid for 3 msec. (three cycles), and only four beams (411, 412, 413, and 414) of five available beams will be swept. In general, each the enable/disable flag, K, order, number of beams, measurement validity time, and order of beams can be sent as IEs or can be system parameters set in the UE 184 and gNB by other means such as back channels or as part of manufacturing.

Figure 9:
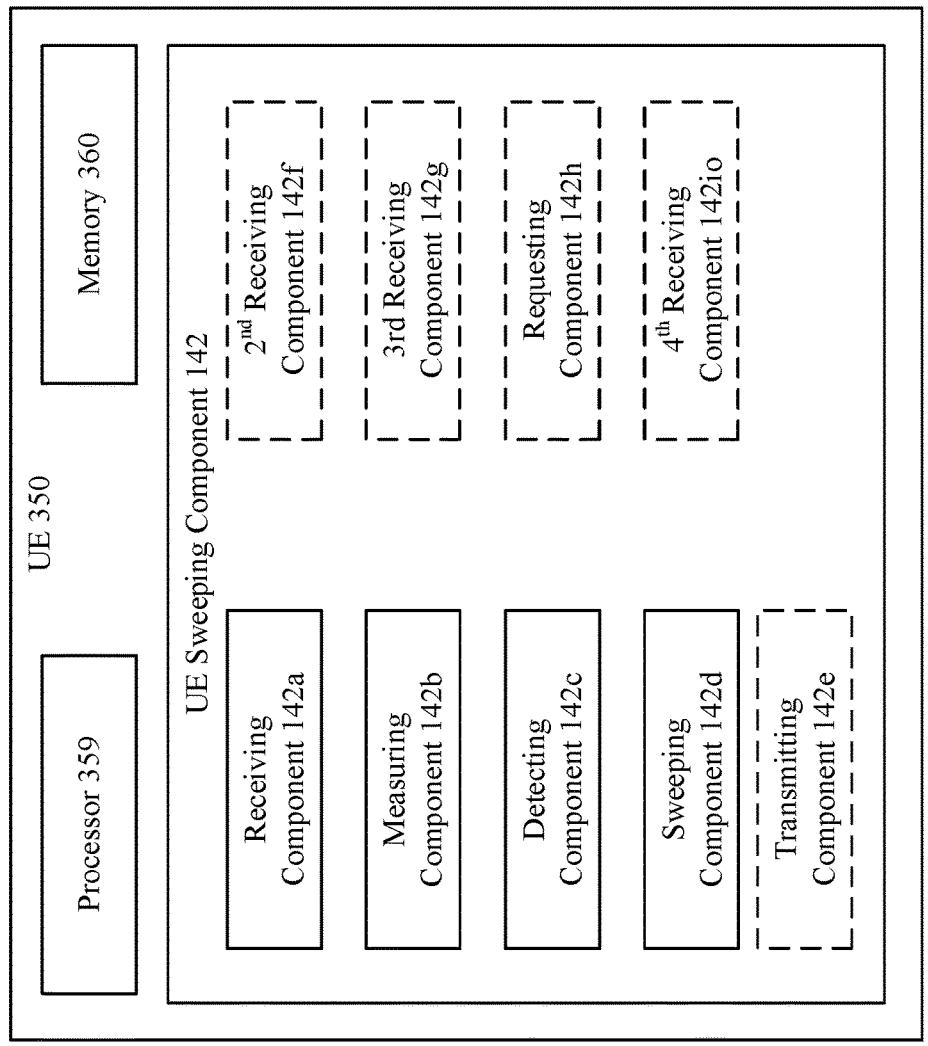
FIG. 9 is a block diagram of a UE, in accordance with examples of the technology disclosed herein.

Referring to FIG. 9, and continuing to refer to prior figures for context, a UE 350 wireless communication disclosed herein is shown, in accordance with examples of the technology disclosed herein. UE 350 includes UE sweeping component 142 as described in conjunction with FIG. 3 above. UE sweeping component 142 includes receiving component 142a. In some examples, the receiving component 142a receives conditions for sweeping beams between the base station 180 and the UE 184. Accordingly, the receiving component 142a may provide means for UE 184 receiving conditions for sweeping beams between the base station 180 and the UE 184.

The UE 184, having received the beam sweeping conditions, measures at least one characteristic of each of the beams in accordance with the measurement configuration—Block 530. In the continuing example, the UE 184 measures CSI-RS swept across beams 411c, 412c, 413c, 414c, and 415c in downlink in accordance with the CSI-MeasConfig received in RRCR 432b, giving the results shown in TABLE 2.

TABLE 2

TCI State Beam 411 (CQI): A dB
TCI State Beam 412 (CQI): B (<A) dB
TCI State Beam 413 (CQI): C (<B) dB
TCI State Beam 414 (CQI): D (< C) dB
TCI State Beam 415 (CQI): E (< D) dB Referring again to FIG. 9, UE sweeping component 142 includes measuring component 142b. In some examples, the measuring component 142b measures at least one characteristic of each of the beams in accordance with the measurement configuration. Accordingly, the measuring component 142b may provide means for measuring at least one characteristic of each of the beams in accordance with the measurement configuration.

After measuring, the UE 184 detects a beam sweeping trigger in accordance with the trigger rule—Block 570. In the continuing example, where K=1, in the cycle after measurements are complete, the UE 184 fails to receive and decode PDSCH 422e on either beam 411e or 412e. In other examples, triggers such as bit error rate on decoding over a time window, PER not maintained at the target level, SRS indicating at the gNB signal strength below threshold, and gNB originated beam change due to load can be used.

Referring again to FIG. 9, UE sweeping component 142 includes detecting component 142c. In some examples, detecting component 142c detects a beam sweeping trigger in accordance with the trigger rule. Accordingly, the measuring component 142b may provide means for detecting a beam sweeping trigger in accordance with the trigger rule.

In response to detecting the trigger, the UE 184 sweeps the beams on uplink based on the measuring—Block 580. In the continuing example, the four beams (411, 412, 413, and 414) of the five measured beams having the strongest CQI are swept. "Sweeping" in the continuing example includes transmitting a NACK in PUCCH on each beam 411f, 412f, 413f, and 414f in sequence in uplink. In some examples, sweeping is performed over the beams that are not blocked (in the continuing example, the beams currently used for data transmission are blocked). Excluding the blocked beams from sweeping can be useful when the system (both the UE 184 and the base station 180) is certain that the error occurred due to blocking. Sweeping all beams is appropriate when the UE 184 or the base station 180 is not able to detect if the error occurred due to blocking.

Referring again to FIG. 9, UE sweeping component 142 includes sweeping component 142d. In some examples, sweeping component 142c sweeps the beams on uplink based on the measuring. Accordingly, the sweeping component 142c may provide means for sweeping the beams on uplink based on the measuring.

Figure 6:
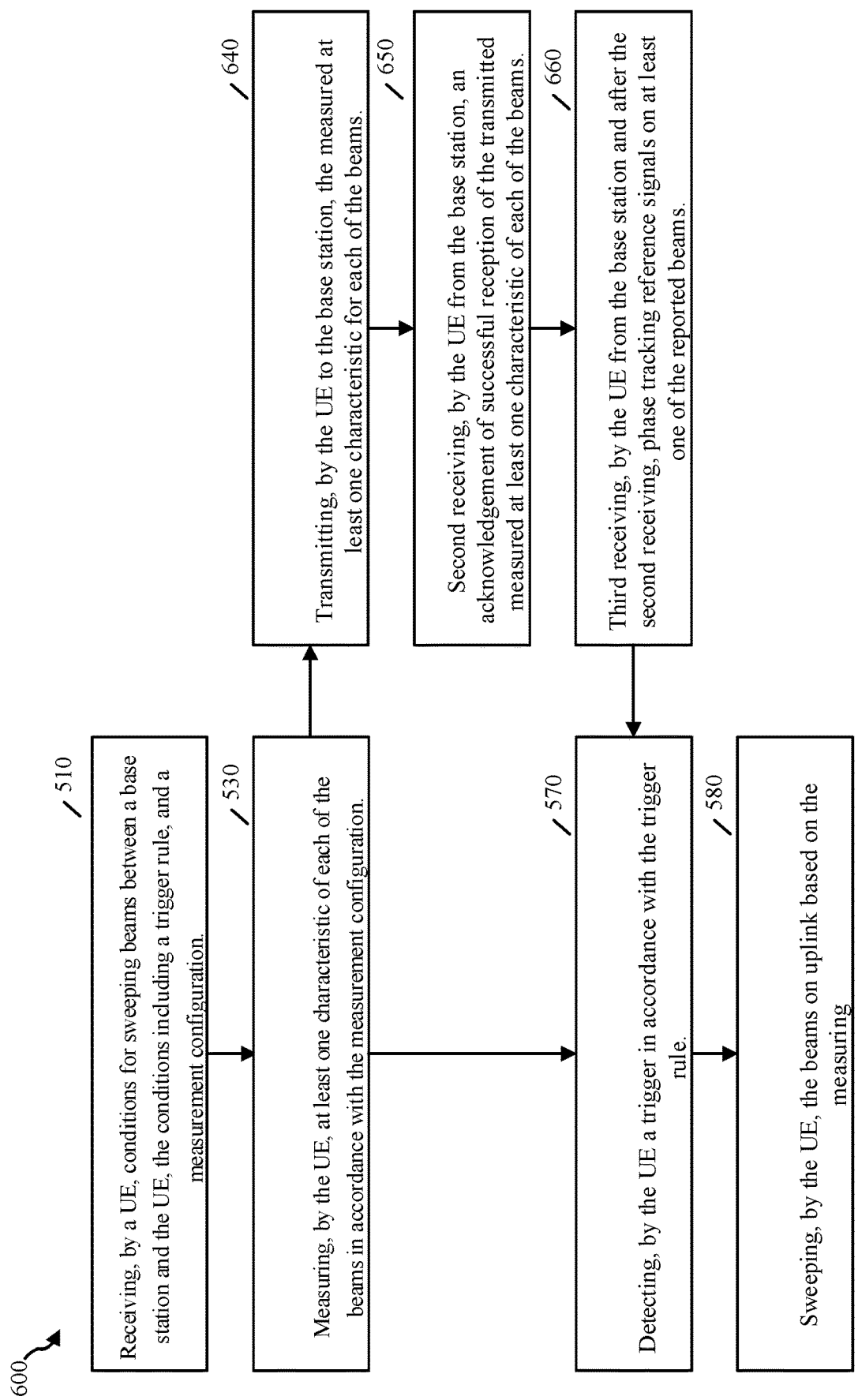
FIG. 6 is a flowchart of methods of wireless communication in accordance with examples of the technology disclosed herein.

Referring to FIG. 6, and continuing to refer to prior figures for context, a flowchart of methods 600 of wireless communication is shown, in accordance with examples of the technology disclosed herein. In such methods 600, Block 510, Block 530, Block 570, and Block 580 are performed as described in connection with FIG. 5.

In such methods 600, after measuring at least one characteristic of each of the beams in accordance with the measurement configuration, and before detecting a trigger, the UE 184 transmits, to the base station, the measured at least one characteristic for each of the beams—Block 640. In the continuing example, the UE 184 transmits the results shown in TABLE 2 to the base station 180 along with an ACK as part of PUCCH 451d on beam 411d in uplink.

In some examples, the measured characteristics are transmitted in other messages, such as an RRC Measurement Report. In some cases, the UE 184 may report a set of beams with a given order, but the base station 180 can configure a beam sweeping pattern within any subset or the whole set and within any order. Consider two cases—Case 1: the UE 184 does not transmit SRS while receiving CSI-RS; and Case 2: the UE 184 transmits SRS in uplink at the same time window during which the UE 184 receives and measures CSI-RS. In Case 1, the base station 180 will select a subset of the reported CSI-RS set for the beam sweeping pattern. In Case 2, the base station 180 can select any beams among those used for CSI-RS and SRS measurements. Hence, in Case 2, the UE 184 may receive a beam sweeping pattern not including any of the beams reported via PUCCH.

Referring again to FIG. 9, in the examples of FIG. 6, UE sweeping component 142 includes transmitting component 142e. In some examples, transmitting component 142e transmits, to the base station, the measured at least one characteristic for each of the beams. Accordingly, the transmitting component 142e may provide means for transmitting, to the base station, the measured at least one characteristic for each of the beams.

The UE 184 second receives, from the base station 180, an acknowledgement of successful reception of the transmitted measurements of the beam characteristics—Block 650. In some examples, the acknowledgement operates as another enable/disable flag serial to the enable/disable flag described in conjunction with FIG. 5. In some examples, the acknowledgment is carried on downlink on DCI. In some examples, the base station 180 uses the acknowledgement to adjust the number, order, or identity of the beams to be swept upon the UE 184 detecting a trigger condition. In the continuing example, acknowledgement is sent by the base station 180 in message 442d using beam 411d in downlink. In some examples, message 442d includes IEs that reorder the assumed beam order, or omit some beams, or substitute others based on information obtained by the network/base station 180 and policy implemented din the network/base station 180. In other examples, no acknowledgment is sent, and the UE 184 assumes, in accordance with the received beam sweeping conditions that the four strongest beams are to be swept on detecting a trigger.

In some examples, another parameter of the beam sweeping pattern, in addition to the TCI state IDs, the number of TCI states, the order, is the duration per TCI state. E.g. consider a UE being close to the base station and the uplink beam sweeping takes place by the UE transmitting 1 symbol PUCCH. In another case, the UE might be far from the base station and the UE might be asked to transmit the same PUCCH format in 2 symbols. For the sake of covering all of the cases, consider the following uplink beam sweeping pattern" TCI State ID 1, duration 1 symbol; TCI State ID 2, duration 1 symbol; TCI State ID 3, duration 2 symbols; TCI State ID 4, duration 2 symbols; and TCI State ID 5, duration, 1 symbol.

Referring again to FIG. 9, in the examples of FIG. 6, UE sweeping component 142 includes second receiving component 142f. In some examples, second receiving component 142f receives, from the base station 180, an acknowledgement of successful reception of the transmitted measurements of the beam characteristics. Accordingly, the transmitting component 142e may provide means for receiving, from the base station 180, an acknowledgement of successful reception of the transmitted measurements of the beam characteristics.

The UE 184 third receives, from the base station 180 and after the second receiving, phase tracking reference signals (PTRS) on at least one of the reported beams—Block 660. In some examples, the base station 180 uses PTRS transmitted on each of a plurality of beams as a way to prepare the UE 184 for use of currently unused beams for both sweeping and for data transfer upon detection of a trigger.

In some examples, when the base station 180 transmits DL PTRS for a given TCI state, this means that the DL TCI State is "prepared" and an eventual TCI state switch from the TCI states currently used for data transmission to this new TCI state can be done relatively quickly. Similarly, in case the UE 184 is requested to transmit PTRS within a given UL TCI state, then, this UL beam is "prepared."

Referring again to FIG. 9, in the examples of FIG. 6, UE sweeping component 142 includes third receiving component 142g. In some examples, third receiving component 142g receives, from the base station 180 and after the second receiving, phase tracking reference signals (PTRS) on at least one of the reported beams. Accordingly, the transmitting component 142e may provide means for receiving, from the base station 180 and after the second receiving, phase tracking reference signals (PTRS) on at least one of the reported beams.

Figure 7:
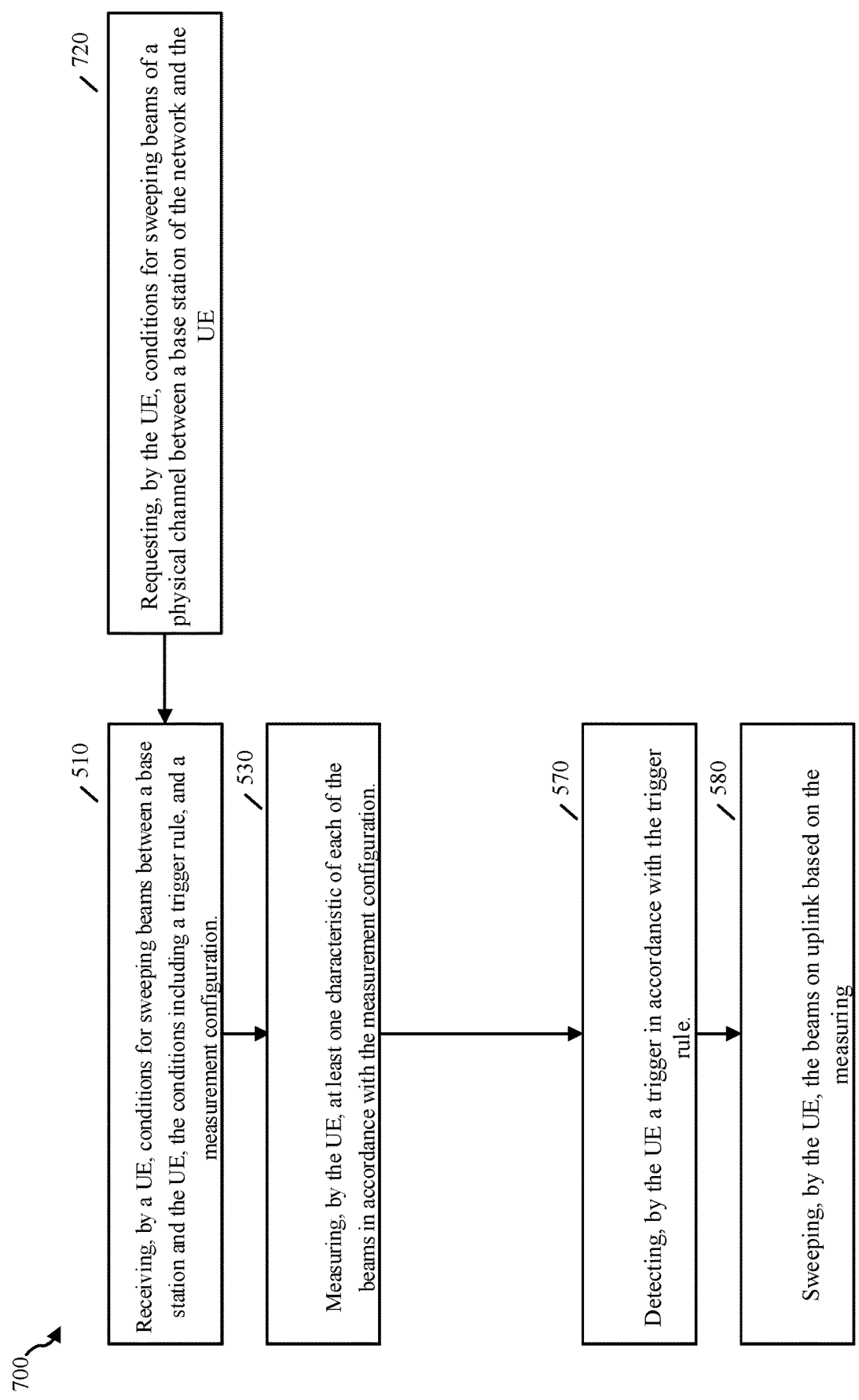
FIG. 7 is a flowchart of methods of wireless communication in accordance with examples of the technology disclosed herein.

Referring to FIG. 7, and continuing to refer to prior figures for context, a flowchart of methods 700 of wireless communication is shown, in accordance with examples of the technology disclosed herein. In such methods 700, Block 510, Block 530, Block 570, and Block 580 are performed as described in connection with FIG. 5. In such methods 700, prior to receiving the conditions, the UE 184 requests conditions for sweeping beams of a physical channel between a base station of the network and the UE—Block 720. In such methods 700, the UE receiving conditions for sweeping beams between a base station of the network and the UE is in response to the requesting. The request can be triggered by the service type, and by how the current quality of service is meeting the service type requirements.

Referring again to FIG. 9, in the examples of FIG. 7, UE sweeping component 142 includes requesting component 142h. In some examples, requesting component 142h requests conditions for sweeping beams of a physical channel between a base station of the network and the UE. Accordingly, the transmitting component 142e may provide means for requesting conditions for sweeping beams of a physical channel between a base station of the network and the UE.

Figure 8:
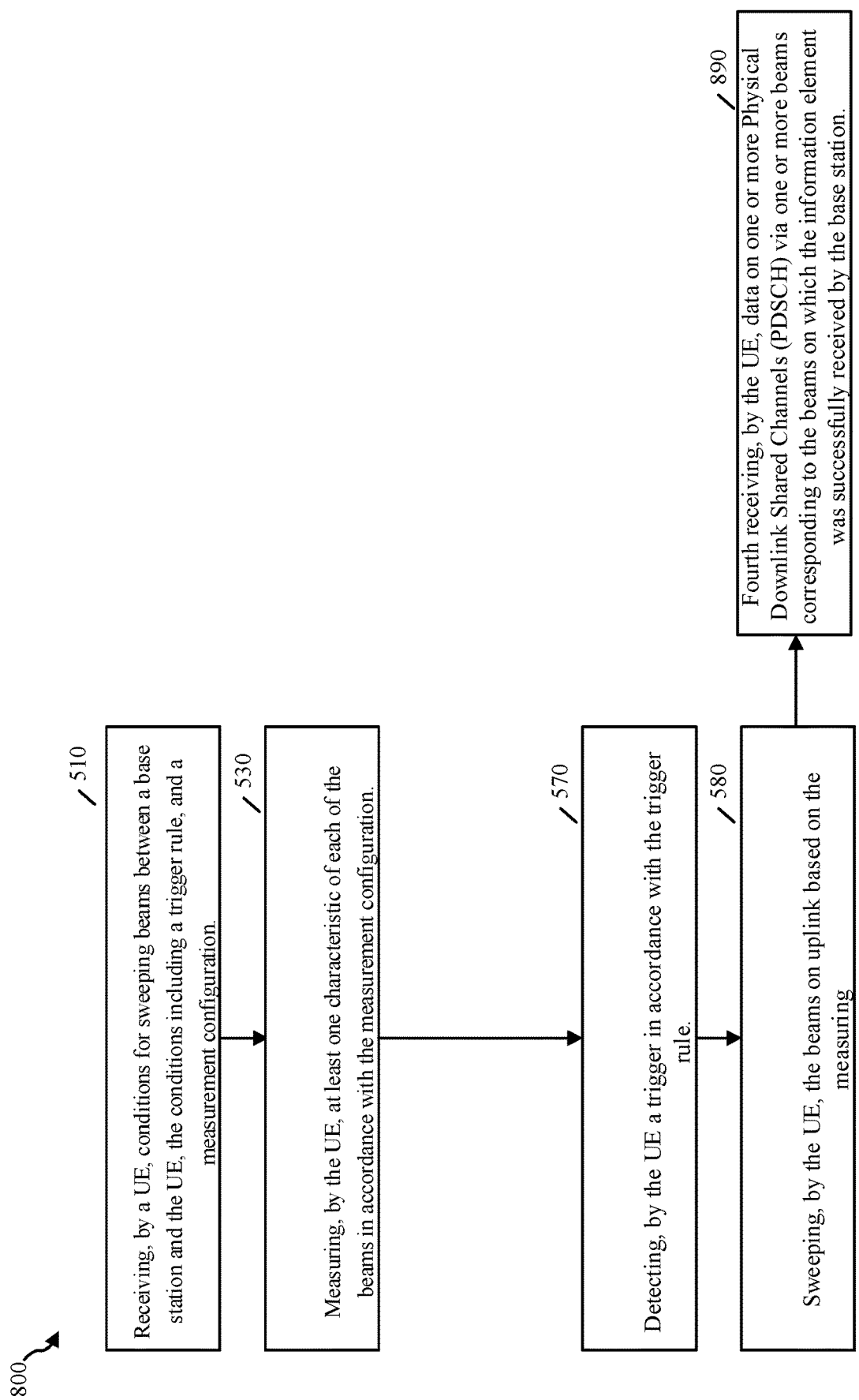
FIG. 8 is a flowchart of methods of wireless communication in accordance with examples of the technology disclosed herein.

Referring to FIG. 8, and continuing to refer to prior figures for context, a flowchart of methods 800 of wireless communication is shown, in accordance with examples of the technology disclosed herein. In such methods 800, Block 510, Block 530, Block 570, and Block 580 are performed as described in connection with FIG. 5. In such methods 800, each swept beam carries a Physical Uplink Control Channel (PUCCH) of the UE that includes an information element regarding the detected trigger. In such methods 800, the UE fourth receives data on one or more Physical Downlink Shared Channels (PDSCH) via one or more beams corresponding to the beams on which the information element was successfully received by the base station—Block 890.

In the continuing example, each of beams 411f, 412f, 413f, and 414f (four of the five measured beams) carries a NACK on PUCCH 451f in uplink. Uplink-downlink channel symmetry applies in the continuing example, and beams 411f and 412f are not received by the base station 180. However, the base station 180 does receive PUCCH 451f carrying NACK (the K=1 trigger condition) on beams 413f and 414f in uplink. As a consequence, the base station 180 transmits and the UE 184 receives both DCI 462g on at least beam 413g in downlink and SPS PDSCH 422g across now-active beams 413g and 414g. The UE 184 can then acknowledge successful reception and decoding of SPS PDSCH 422g using ACK on PUCCH 451g in uplink on beams 413g and 414g. Without further blocking or interference, the base station will continue to transmit subsequent SPS PDSCH, e.g., SPS PDSCH 422h, on beams 413 and 414 in downlink, e.g., beams 413h and 414h. In some examples, the UE 184 prepares its receiver to receive retransmission or DCI via the same beam sweeping pattern (or a subset of it). Hence, the UE 184 receiver, expects Beam 1 at time t0, beam 2 at time t1=t0+1 symbol, beam 3 at t2=t1+1 symbol, etc. The base station receives the first correct version of PUCCH with the NACK from TCI state ID (beam)—see Block 580 described above. In the continuing example, it does not make sense to perform retransmission and DCI transmission via the blocked beams, then, the base station 180 transmits at t2 the beam 3, knowing that the UE is expecting this transmission of TCI state ID 3 at this time instant.

Referring again to FIG. 9, in the examples of FIG. 8, UE sweeping component 142 includes fourth receiving component 142g. In some examples, fourth receiving component 142g receives data on one or more Physical Downlink Shared Channels (PDSCH) via one or more beams corresponding to the beams on which the information element was successfully received by the base station. Accordingly, the transmitting component 142e may provide means for receiving data on one or more Physical Downlink Shared Channels (PDSCH) via one or more beams corresponding to the beams on which the information element was successfully received by the base station.

Figure 10:
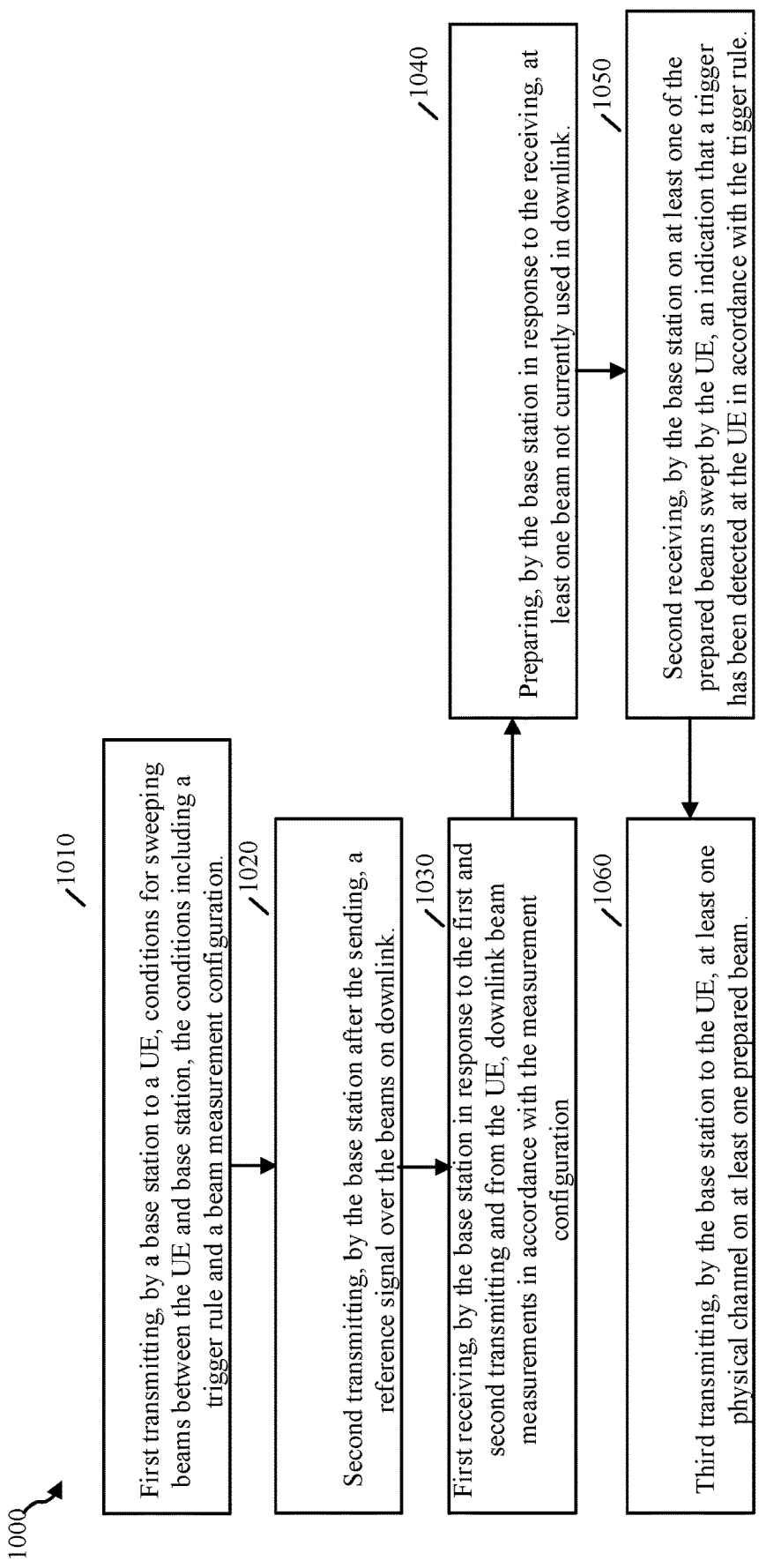
FIG. 10 is a flowchart of methods of wireless communication in accordance with examples of the technology disclosed herein.

Referring to FIG. 10, and continuing to refer to prior figures for context, a flowchart of methods 1000 of wireless communication is shown, in accordance with examples of the technology disclosed herein. In such methods, the base station 180 first transmits, to a UE of the network, the conditions for sweeping beams between the UE 184 and the base station 180—Block 1010. Similar to the description of FIG. 5, but from the view of the base station 180 rather than the UE 184, the conditions include a beam sweeping trigger rule, and a beam measurement configuration for measuring at least one characteristic of each of the beams on downlink. In the continuing example, the trigger rule and the beam measurement configuration are carried as IEs as part of RRCR 432b via beam 411b on downlink. RRCR 432b includes the CSI-MeasConfig IE of TABLE 1. As noted above, the "beamSweepingUponNack" flag is "true," the "Origin" indicates "UE Originated" "UL Beam Sweeping," and K=1. The order of sweeping is the order of transmission configuration indicator TCI state reporting—the TCI state order already used for PDSCH or PUSCH and the strongest reported TCI states in descending order. In the continuing example, the measurement results are valid for 3 msec. (three cycles), and only four beams (411, 412, 413, and 414) of five available beams will be swept.

Figure 13:
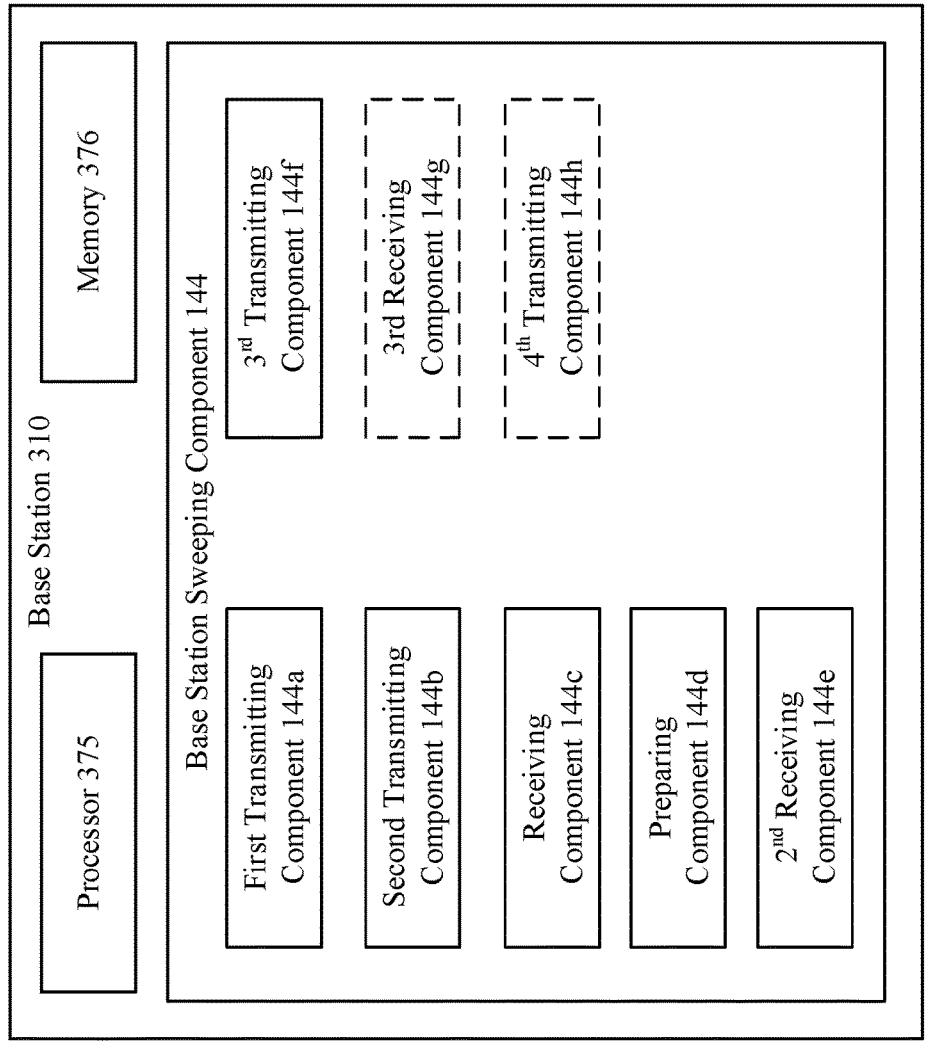
FIG. 13 is a block diagram of a base station, in accordance with examples of the technology disclosed herein.

Referring to FIG. 13, and continuing to refer to prior figures for context, a base station 310 for wireless communication disclosed herein is shown, in accordance with examples of the technology disclosed herein. Base station 310 includes base station sweeping component 144 as described in conjunction with FIG. 3 above. Base station sweeping component 144 includes first transmitting component 144a. In some examples, first transmitting component 144a first transmits, to a UE of the network, the conditions for sweeping beams between the UE 184 and the base station 102. Accordingly, the first transmitting component 144a may provide means for first transmitting, to a UE 184 of the network, the conditions for sweeping beams between the UE 184 and the base station 102.

The base station 180 second transmits, after the first transmitting, a reference signal over the beams on downlink—Block 1020. In the continuing example, the base station 180 second transmits CSI-RS swept across beams 411c, 412c, 413c, 414c, and 415c in downlink in accordance with the CSI-MeasConfig transmitted in RRCR 432b. Referring to FIG. 13, base station sweeping component 144 includes second transmitting component 144b. In some examples, second transmitting component 144b second transmits, after the first transmitting, a reference signal over the beams on downlink. Accordingly, the second transmitting component 144b may provide means for transmitting, after the first transmitting, a reference signal over the beams on downlink.

Base station 180 first receives from the UE 184, in response to the first and second transmitting, downlink beam measurements in accordance with the beam measurement configuration—Block 1030. In the continuing example, the UE 184 transmits the results shown in TABLE 2 to the base station 180 along with an ACK as part of PUCCH 451d on beam 411d in uplink. Referring to FIG. 13, base station sweeping component 144 includes receiving component 144c. In some examples, receiving component 144c first receives from the UE 184, in response to the first and second transmitting, downlink beam measurements in accordance with the beam measurement configuration. Accordingly, the first receiving component 144c may provide means for first receiving from the UE 184, in response to the first and second transmitting, downlink beam measurements in accordance with the beam measurement configuration.

Base station 180 prepares, in response to the first receiving, at least one beam not currently used in downlink—Block 1040. In some examples, the base station 180 uses PTRS transmitted on each of a plurality of beams as a way to prepare the UE 184 for use of currently unused beams for both sweeping and for data transfer upon detection of a trigger. Referring to FIG. 13, base station sweeping component 144 includes preparing component 144d. In some examples, preparing component 144d prepares, in response to the first receiving, at least one beam not currently used in downlink. Accordingly, the preparing component 144d may provide means to prepare, in response to the first receiving, at least one beam not currently used in downlink.

Base station 180 second receives, on at least one of the prepared beams swept by the UE, an indication that a trigger has been detected at the UE in accordance with the trigger rule—Block 1050. In the continuing example, the four beams (411, 412, 413, and 414) of the five measured beams having the strongest CQI are swept by the UE 184. "Sweeping" in the continuing example includes transmitting a NACK in PUCCH 451f on each beam 411f, 412f, 413f, and 414f in sequence in uplink. Referring to FIG. 13, base station sweeping component 144 includes second receiving component 144e. In some examples, second receiving component 144e receives, on at least one of the prepared beams swept by the UE, an indication that a trigger has been detected at the UE in accordance with the trigger rule. Accordingly, the second receiving component 144e may provide means to receive, on at least one of the prepared beams swept by the UE, an indication that a trigger has been detected at the UE in accordance with the trigger rule.

Base station 180 third transmits, by the base station to the UE, at least one physical channel on at least one prepared beam—Block 1060. In the continuing example, the base station 180 after receiving PUCCH 451f carrying NACK (the K=1 trigger condition) on beams 413f and 414f in uplink, transmits both DCI 462g on at least beam 413g in downlink to the UE 184 and SPS PDSCH 422g across now-active beams 413g and 414g. The UE 184 can then acknowledge successful reception and decoding of SPS PDSCH 422g using ACK on PUCCH 451g in uplink on beams 413g and 414g. Without further blocking or interference, the base station will continue to transmit subsequent SPS PDSCH, e.g., SPS PDSCH 422h, on beams 413 and 414 in downlink, e.g., beams 413h and 414h.

Referring to FIG. 13, base station sweeping component 144 includes third transmitting component 144f. In some examples, third transmitting component 144f transmits, to the UE, at least one physical channel on at least one prepared beam. Accordingly, the third transmitting component 144f may provide means to transmit, to the UE, at least one physical channel on at least one prepared beam.

Figure 11:
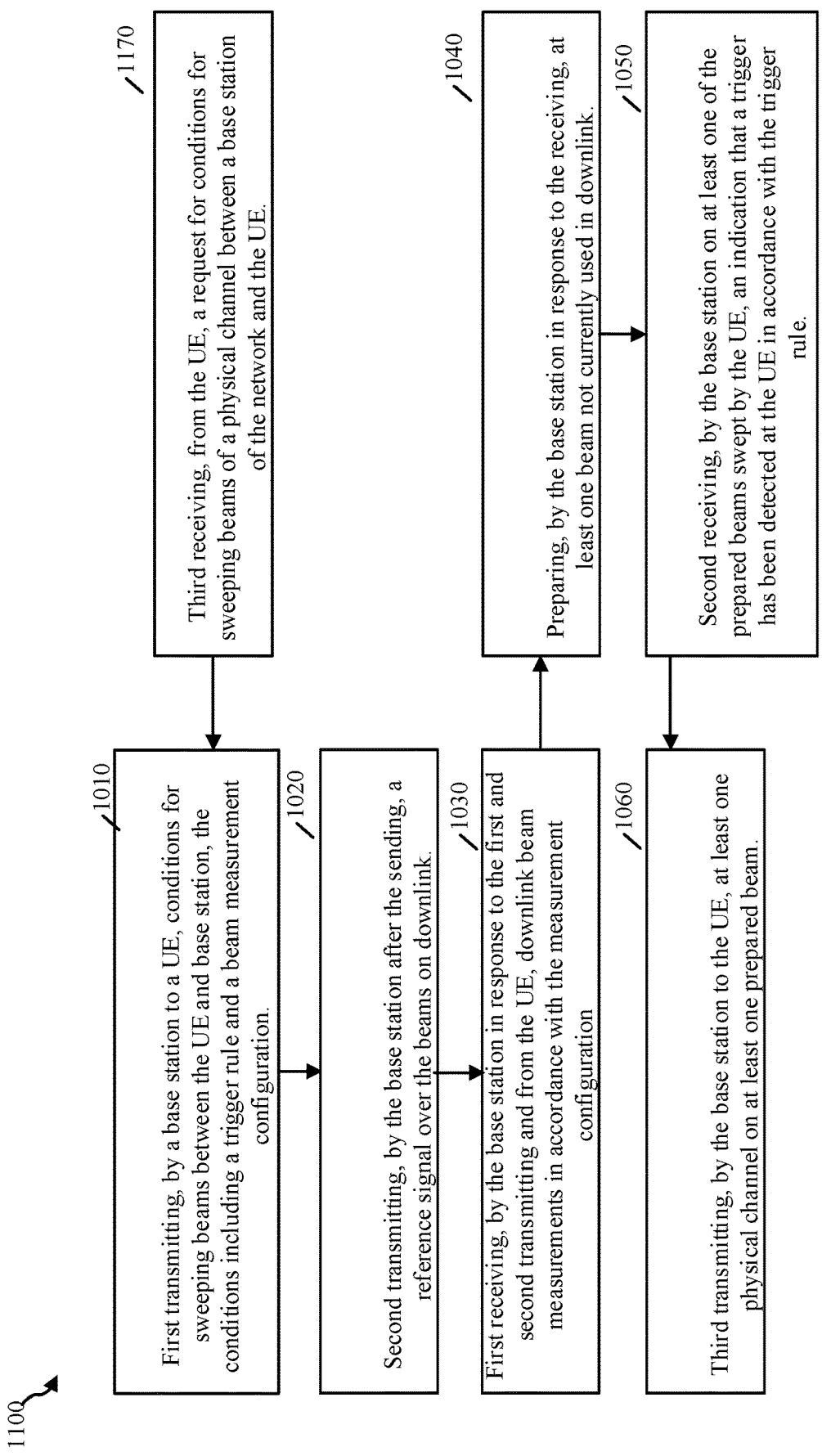
FIG. 11 is a flowchart of methods of wireless communication in accordance with examples of the technology disclosed herein.

Referring to FIG. 11, and continuing to refer to prior figures for context, a flowchart of methods 1100 of wireless communication is shown, in accordance with examples of the technology disclosed herein. In such methods 1100, Block 1010, Block 1020, Block 1030, Block 1040, Block 1050, and Block 1060 are performed as described in connection with FIG. 10. In such methods 1100, the base station 180 third receives, from the UE 184, a request for conditions for sweeping beams of a physical channel between a base station 180 and the UE 184—Block 1170. In such methods 700, the UE receiving conditions for sweeping beams between a base station of the network and the UE is in response to the requesting.

Referring to FIG. 13, base station sweeping component 144 includes third receiving component 144g. In some examples, third receiving component 144g receives, from the UE 184, a request for conditions for sweeping beams of a physical channel between a base station 180 and the UE 184. Accordingly, third receiving component 144g may provide means for receiving, from the UE 184, a request for conditions for sweeping beams of a physical channel between a base station 180 and the UE 184.

Figure 12:
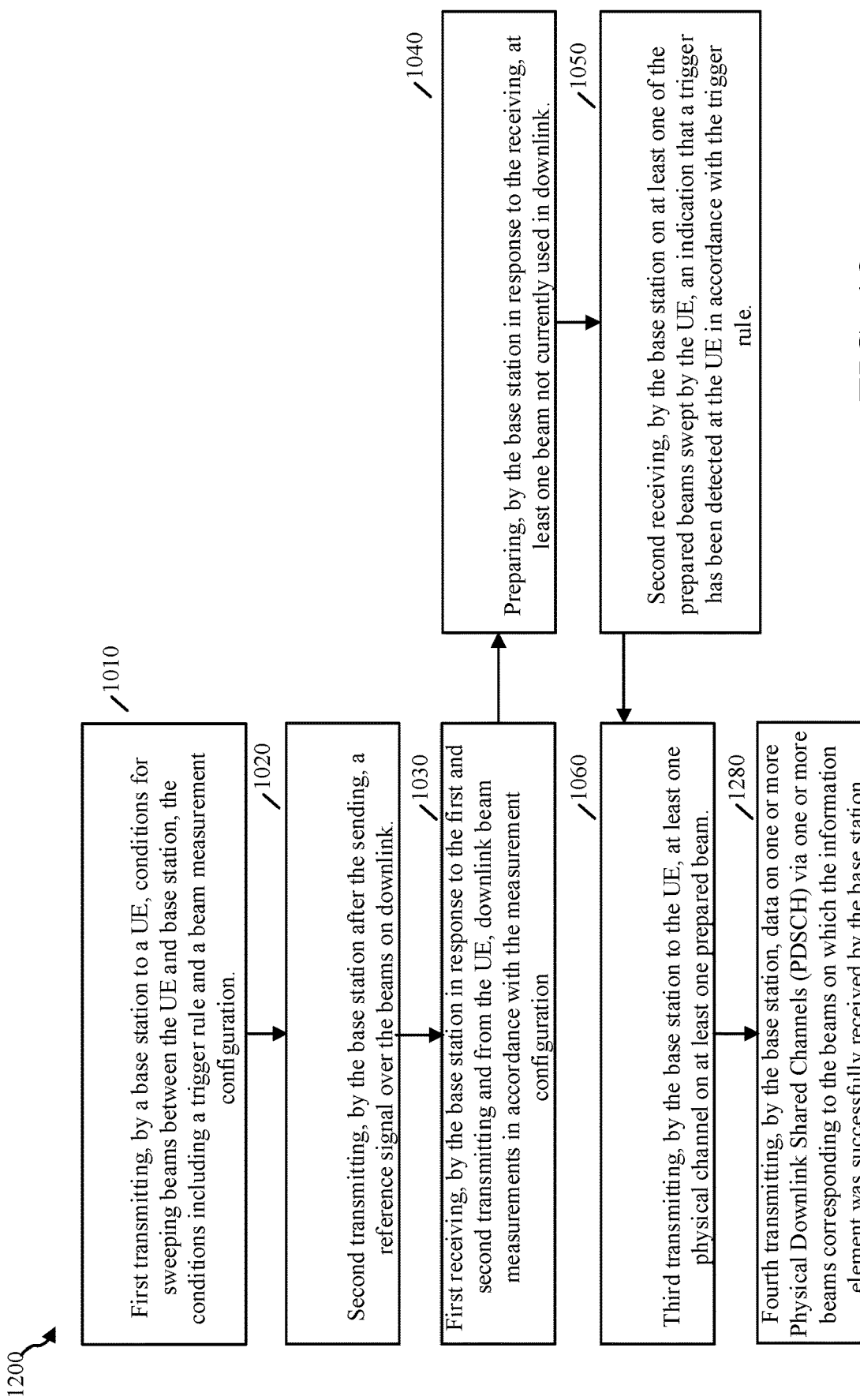
FIG. 12 is a flowchart of methods of wireless communication in accordance with examples of the technology disclosed herein.

Referring to FIG. 12, and continuing to refer to prior figures for context, a flowchart of methods 1200 of wireless communication is shown, in accordance with examples of the technology disclosed herein. In such methods 1200, Block 1010, Block 1020, Block 1030, Block 1040, Block 1050, and Block 1060 are performed as described in connection with FIG. 10. In such methods 1200, the base station 180 fourth transmits data on one or more Physical Downlink Shared Channels (PDSCH) via one or more beams corresponding to the beams on which the information element was successfully received by the base station 180—Block 1280. In such methods, each second received beam carries a Physical Uplink Control Channel (PUCCH) of the UE that includes an information element regarding a trigger detected in accordance with the sweeping trigger rule.

In the continuing example, each of beams 411$f$, 412$f$, 413$f$, and 414$f$ (four of the five measured beams) carries a NACK on PUCCH 451$f$ in uplink from the UE 184 to the base station 180. Uplink-downlink channel symmetry applies in the continuing example, and beams 411$f$ and 412$f$ are not received by the base station 180. However, the base station 180 does receive PUCCH 451$f$ carrying NACK (the K=1 trigger condition) on beams 413$f$ and 414$f$ in uplink. As a consequence, the base station 180 transmits and the UE 184 receives both DCI 462$g$ on at least beam 413$g$ in downlink and SPS PDSCH 422$g$ across now-active beams 413$g$ and 414$g$. The UE 184 can then acknowledge successful reception and decoding of SPS PDSCH 422$g$ using ACK on PUCCH 451$g$ in uplink on beams 413$g$ and 414$g$. Without further blocking or interference, the base station will continue to transmit subsequent SPS PDSCH, e.g., SPS PDSCH 422$h$, on beams 413 and 414 in downlink, e.g., beams 413$h$ and 414$h$.

Referring to FIG. 13, base station sweeping component 144 includes fourth transmitting component 144$h$. In some examples, fourth transmitting component 144$h$ transmits data on one or more Physical Downlink Shared Channels (PDSCH) via one or more beams corresponding to the beams on which the information element was successfully received by the base station 180. Accordingly, the fourth transmitting component 144$h$ may provide means for transmitting data on one or more Physical Downlink Shared Channels (PDSCH) via one or more beams corresponding to the beams on which the information element was successfully received by the base station 180.

Figure 14:
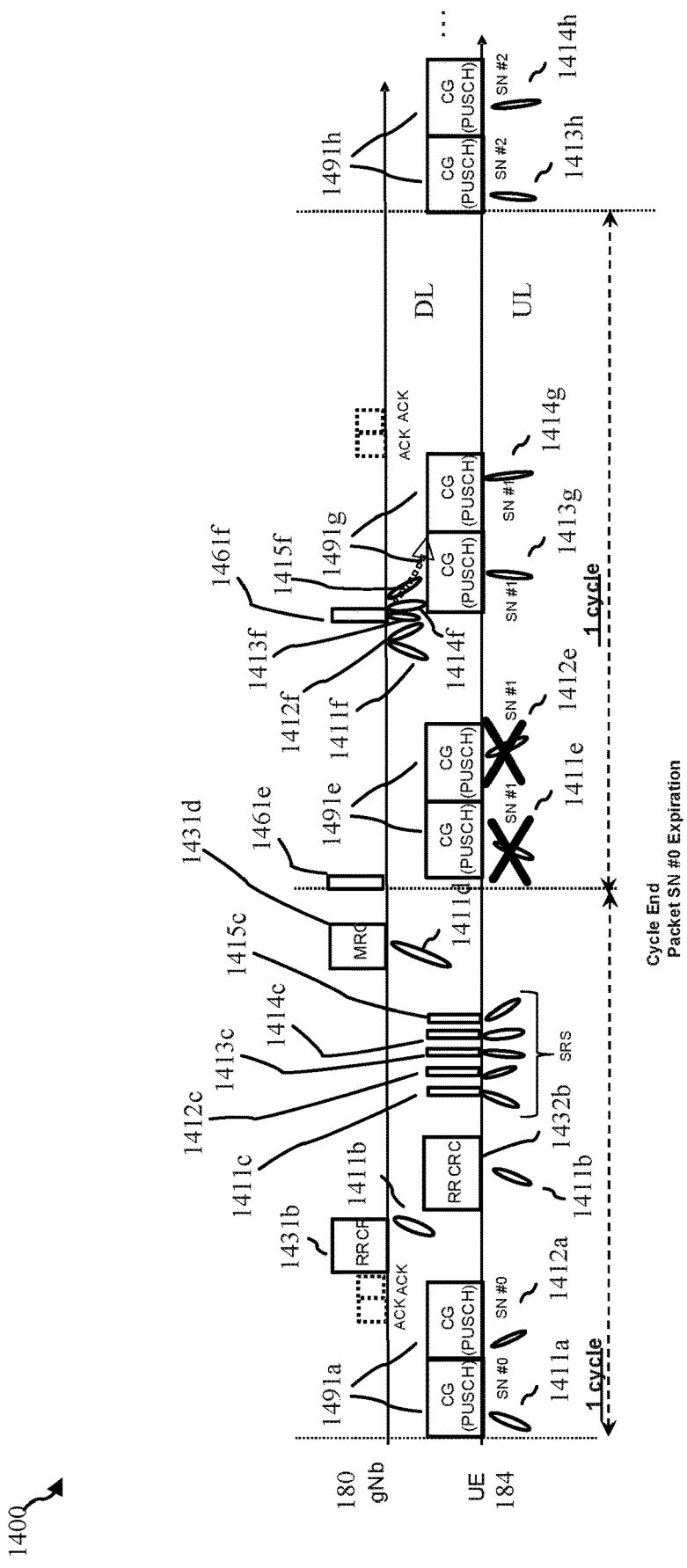
FIG. 14 is a diagram illustrating relationships between a UE and a base station for wireless communication, in accordance with examples of the technology disclosed herein.

Referring to FIG. 14, and continuing to refer to prior figures for context, a second notional representation of transmissions between a base station 180 (also referred to as "gNB" in the example) and a UE 184 is shown, in accordance with examples of the technology disclosed herein. In the second continuing example, the UE 184 and the gNB 180 are initially connected in an URLLC usage scenario under semi-persistent scheduling (SPS) as indicated by two copies of PUSCH 1491$a$. One copy of PUSCH 1491$a$ is carried on beam 1411$a$ in uplink from the UE 184 to the base station 180, while the other copy of PUSCH 1491$a$ is carried on beam 1412$a$ in uplink from the UE 184.

Figure 15:
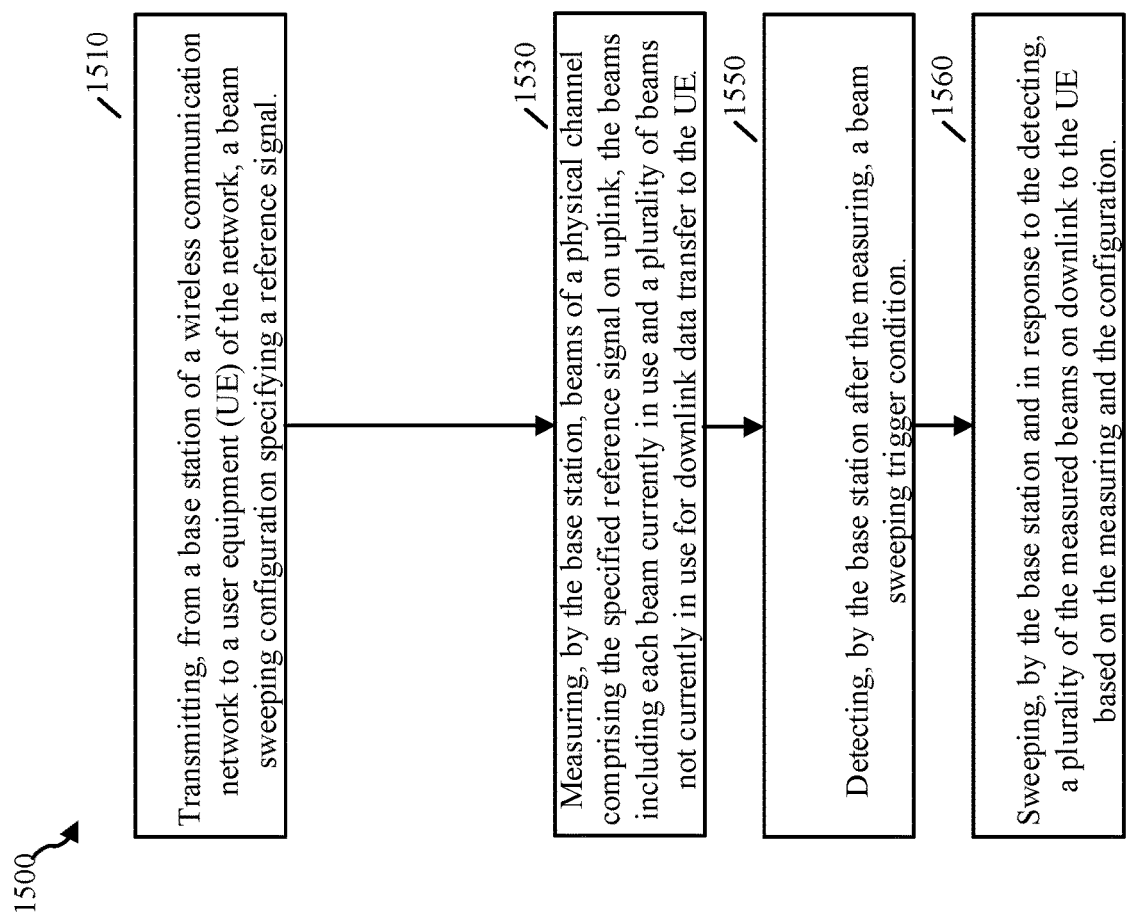
FIG. 15 is a flowchart of methods of wireless communication in accordance with examples of the technology disclosed herein.

Referring to FIG. 15, and continuing to refer to prior figures for context, a flowchart of methods 1500 of wireless communication is shown, in accordance with examples of the technology disclosed herein. In such methods, the base station 180 transmits, to a UE 184, a beam sweeping configuration specifying a reference signal—Block 1510. In the second continuing example, the reference signal specification carried as information element (IEs) in a Radio Resource Control-level (RRC-level) message, specifically as part of RRCReconfiguration (RRCR) 1431$b$ via beam 1411$b$ on downlink. RRCR 1431$b$ includes an SRS-Config IE modified with a beam sweeping IEs described above in a manner similar to that described in conjunction with FIG. 5 and TABLE 1, an example of which is shown in TABLE 3. In the example of TABLE 3, the conditions include a "beamSweepingUponNack" flag for DL traffic. The flag can take on the Boolean values "true" (beam sweeping enabled) and false (beam sweeping disabled). The conditions include an "Origin" designator for sweeping originated by the UE 184 and sweeping originated by the gNB 180. In the second continuing example, the "Origin" flag is set to "gNB originated." The conditions include a trigger rule that is trigged upon detecting a number K of consecutive unsuccessful receptions by the UE of a downlink transmission on a physical channel carried on the beams. K can take on an integer values from 1-12. The particular value of K is determined, at least in part, on the reliability level required for the connection. Note that with sweeping in the second continuing example, K is not used since the "Origin" flag is set to "gNB Originated." Note that beam sweeping by the UE takes place only if the "beamSweepingUponNack" flag is "true" and the "Origin" indicates "gNB Originates" "UL Beam Sweeping." In the second continuing example, beam sweeping is enabled, and the "Origin" flag is set to "gNB Originated." K is not specified since the base station 180 trigger criteria (not receiving a single session—similar to K=1—of PUSCH when expected) does not need to be communicated to the UE 184.

TABLE 3

SRS-Config information element
-- ASN1START
-- TAG-SRS-CONFIG-START
SRS-Config ::=           SEQUENCE {
    srs-ResourceSetToReleaseList    SEQUENCE (SIZE(1..maxNrofSRS-ResourceSets)) OF SRS-ResourceSetId OPTIONAL, -- Need N TABLE 3-continued

```
    srs-ResourceSetToAddModList      SEQUENCE (SIZE(1..maxNrofSRS-ResourceSets)) OF SRS-
ResourceSet OPTIONAL, -- Need N
    srs-ResourceToReleaseList    SEQUENCE (SIZE(1..maxNrofSRS-Resources)) OF SRS-ResourceId
OPTIONAL, -- Need N
    srs-ResourceToAddModList       SEQUENCE (SIZE(1..maxNrofSRS-Resources)) OF SRS-Resource
OPTIONAL, -- Need N
    . . .
OPTIONAL, -- Need N
    beamSweepingUponNack (DL Traffic) : Boolean {true, false}
    (if "beamSweepingUponNack" true,
       Beam Sweeping After K Nacks, K (1, 2, 3, 4, . . . , 12}
       Origin: {UL Beam Sweeping - UE Originated, DL Beam Sweeping -
gNB Originated}
}
```

In some examples of the technology disclosed herein, the IEs for beam sweeping can be carried in other RRC-level messages such as RRCSetup, RRCResume, and System Information Blocks (SIBs) SIB2 or SIB 3. More generally, the IEs for beam sweeping can be carried in any RRC-level message without the IEs being part of SRS-Config used here as an example.

In addition, the technology disclosed herein can control an order of the beams for sweeping, and a number of beams to sweep. In the second continuing example, the order of sweeping and number of beams to sweep is specified in SRS-Config. In the second continuing example, all five of the available beams will be swept on uplink from the UE 184. In general, each of the enable/disable flag, K, order, number of beams, and order of beams can be sent as IEs or can be system parameters set in the UE 184 and gNB by other means such as backhaul or sidelink channels or as part of manufacturing.

Figure 19:
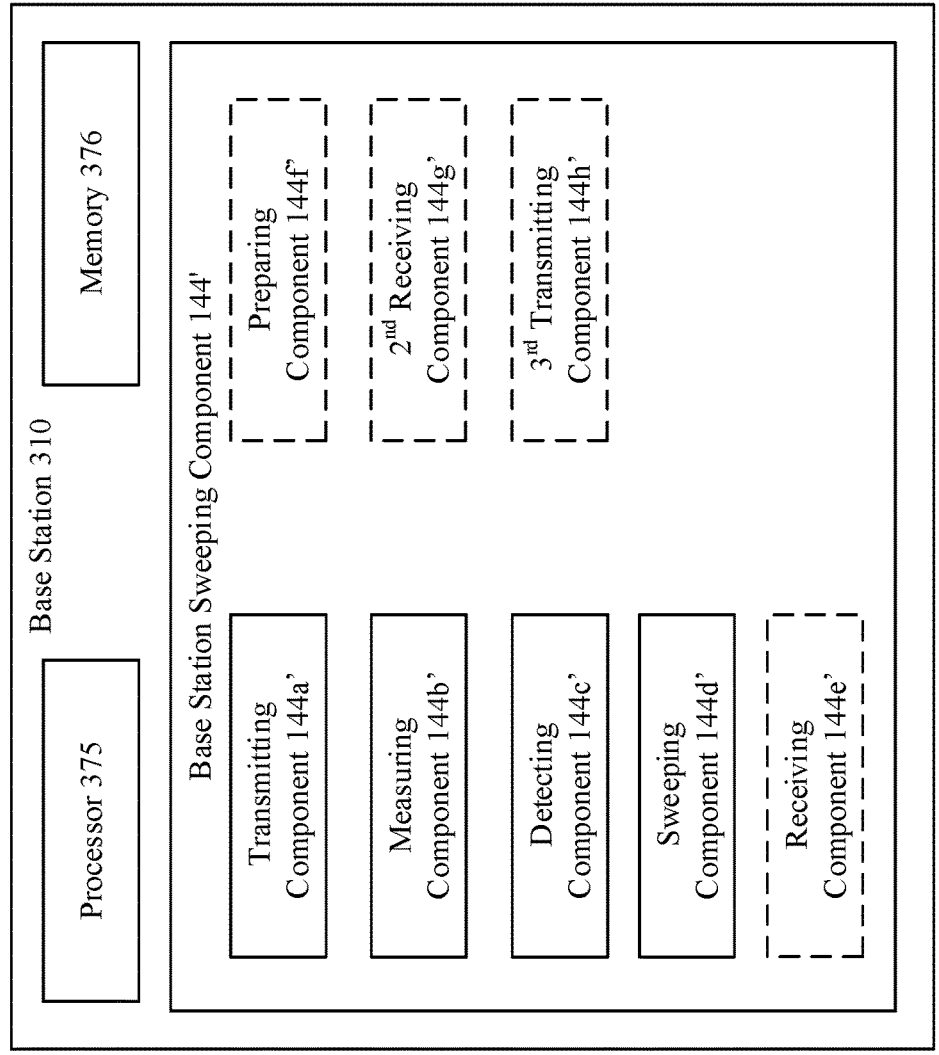
FIG. 19 is a block diagram of a base station, in accordance with examples of the technology disclosed herein.

Referring to FIG. 19, and continuing to refer to prior figures for context, a base station 310 for wireless communication disclosed herein is shown, in accordance with examples of the technology disclosed herein. Base station 310 includes base station sweeping component 144' as described in conjunction with FIG. 3 above. Base station sweeping component 144' includes transmitting component 144a'. In some examples, transmitting component 144a' transmits, to a UE 184, a beam sweeping configuration specifying a reference signal. Accordingly, the transmitting component 144a' may provide means for transmitting, to a UE 184, a beam sweeping configuration specifying a reference signal.

The base station 180 measures at least one characteristic of each of a plurality of beams of a physical channel and comprising the specified reference signal from the UE to the base station on uplink—Block 1530. The beams include each beam currently in use for communication between the base station and the UE and a plurality of beams not currently in use for downlink data transfer to the UE. In the second continuing example, the base station 180 measures SRS swept across beams 1411c, 1412c, 1413c, 1414c, and 1415c in uplink giving the results shown in TABLE 4.

TABLE 4

TCI State Beam 1411 (CQI): A dB
TCI State Beam 1412 (CQI): B (<A) dB
TCI State Beam 1413 (CQI): C (<B) dB
TCI State Beam 1414 (CQI): D (< C) dB
TCI State Beam 1415 (CQI): E (< D) dB Referring to FIG. 19, and continuing to refer to prior figures for context, a base station 310 for wireless communication disclosed herein is shown, in accordance with examples of the technology disclosed herein. Base station 310 includes base station sweeping component 144' as described in conjunction with FIG. 3 above. Base station sweeping component 144' includes measuring component 144b'. In some examples, measuring component 144b' measures at least one characteristic of each of a plurality of beams of a physical channel and comprising the specified reference signal from the UE to the base station on uplink. Accordingly, the measuring component 144b' may provide means for measuring at least one characteristic of each of a plurality of beams of a physical channel and comprising the specified reference signal from the UE to the base station on uplink.

The base station 180 detects, after the measuring, a beam sweeping trigger condition—Block 1550. In the second continuing example, the base station 180 does not receive the expected two copies of PUSCH 1491e on beams 1411e and 1412e at the beginning of the second cycle and after having transmitted DCI 1461e. Not receiving a single expected PUSCH—similar to K=1—of PUSCH when expected results in a detected trigger. In other examples, triggers such as bit error rate on decoding over a time window can be used.

Referring again to FIG. 19, base station sweeping component 144' includes detecting component 144c'. In some examples, detecting component 144c' detects, after the measuring, a beam sweeping trigger condition. Accordingly, the measuring component 144b' may provide means for detecting, after the measuring, a beam sweeping trigger condition.

The base station 180 sweeps, in response to the detecting, a plurality of the measured beams on downlink to the UE based on the measuring and the configuration—Block 1560. In the second continuing example, base station sweeps the five beams (1411f, 1412f, 1413f, 1414f, and 1415f) in order of strength. "Sweeping" in the second continuing example includes transmitting DCI 1461f on downlink on each beam in order of decreasing measure uplink power. Note that in both uplink and downlink sweeping, the base station 180 or UE 184 can use criteria other than decreasing power to order some or all of the available beams for sweeping. For example, the base station 180 may exclude beams presumed blocked for failure of PUSCH on uplink, e.g., 1411 and 1412. As another example, the base station may exclude beams reserved for some other purpose.

Referring again to FIG. 19, base station sweeping component 144' includes sweeping component 144d'. In some examples, sweeping component 144d' sweeps, in response to the detecting, a plurality of the measured beams on downlink to the UE based on the measuring and the configuration. Accordingly, the measuring component 144b' may provide means for sweeping, in response to the detecting, a plurality of the measured beams on downlink to the UE based on the measuring and the configuration.

Figure 16:
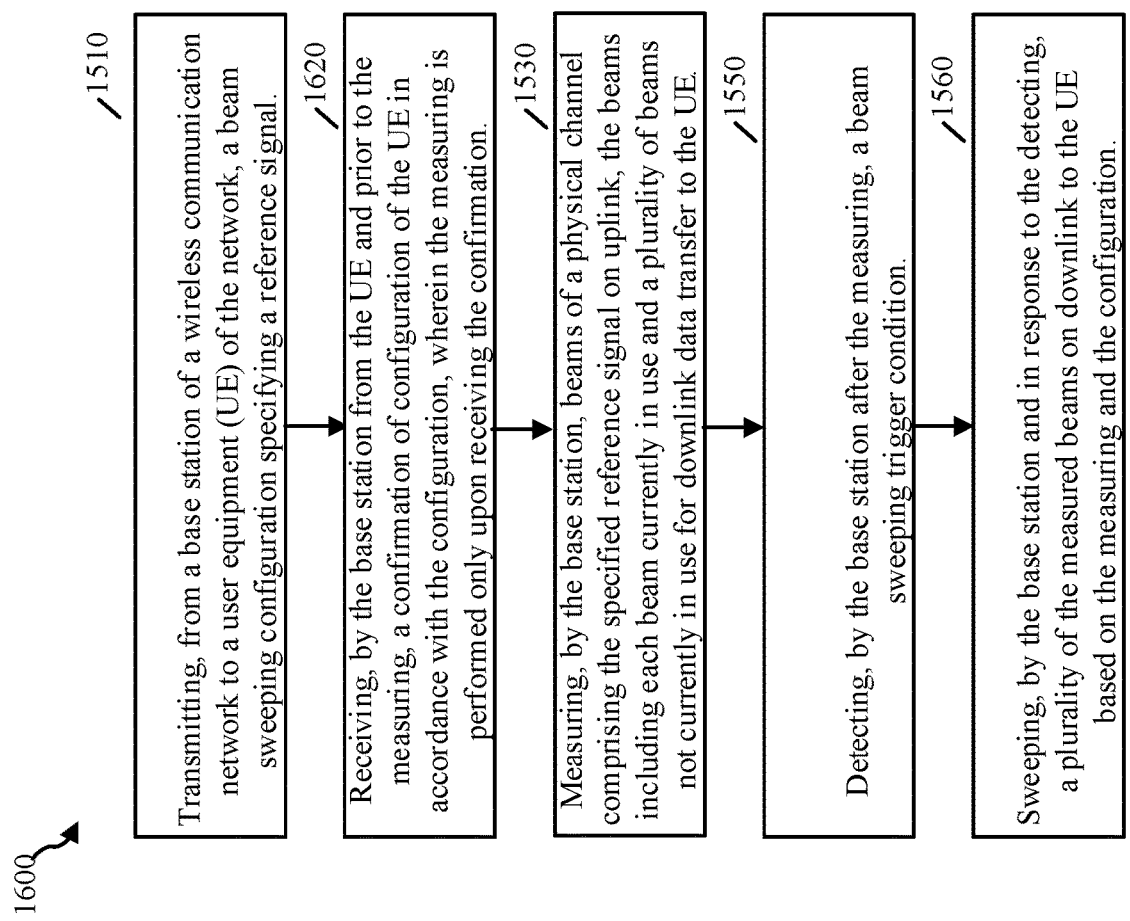
FIG. 16 is a flowchart of methods of wireless communication in accordance with examples of the technology disclosed herein.

Referring to FIG. 16, and continuing to refer to prior figures for context, a flowchart of methods 1600 of wireless communication is shown, in accordance with examples of the technology disclosed herein. In such methods 1600, Block 1510, Block 1530, Block 1550, and Block 1560 are performed as described in connection with FIG. 15. In such methods 1600, the base station 180 receives, from the UE and prior to the measuring, a confirmation of configuration of the UE in accordance with the transmitted beam sweeping configuration—Block 1620. In the second continuing example, the base station receives RRCRConfirmation 1432b on beam 1411b in uplink confirming that the UE 184 is configured according to the RRCR 1431b sent by the base station 180 on 1411b in downlink earlier in the cycle. Referring again to FIG. 19, base station sweeping component 144' includes receiving component 144e'. In some examples, receiving component 144e' receives, from the UE and prior to the measuring, a confirmation of configuration of the UE in accordance with the transmitted beam sweeping configuration. Accordingly, receiving component 144e' may provide means for receiving, from the UE and prior to the measuring, a confirmation of configuration of the UE in accordance with the transmitted beam sweeping configuration.

Figure 17:
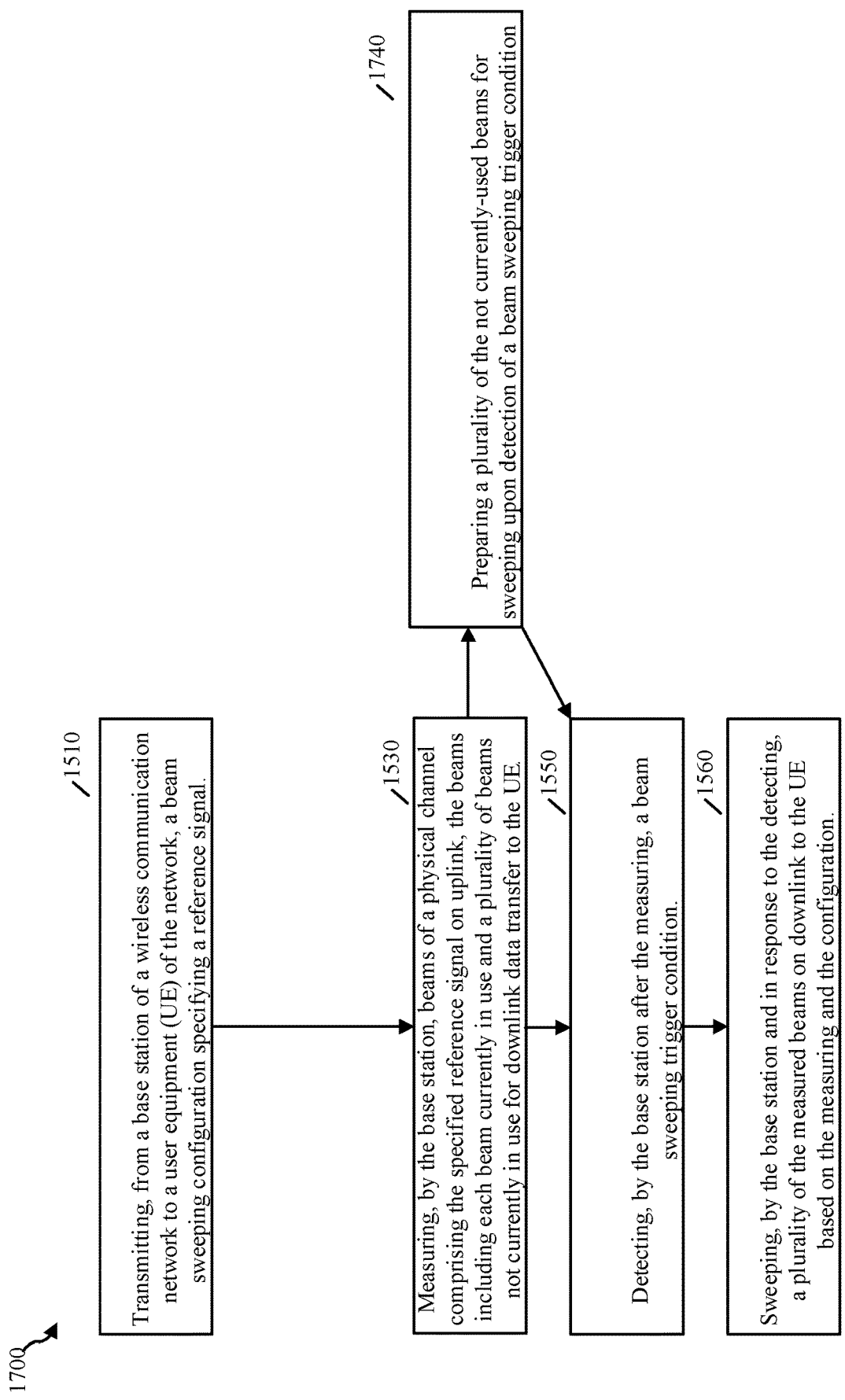
FIG. 17 is a flowchart of methods of wireless communication in accordance with examples of the technology disclosed herein.

Referring to FIG. 17, and continuing to refer to prior figures for context, a flowchart of methods 1700 of wireless communication is shown, in accordance with examples of the technology disclosed herein. In such methods 1700, Block 1510, Block 1530, Block 1550, and Block 1560 are performed as described in connection with FIG. 15. In such methods 1700 after the measuring, the base station prepares a plurality of the not currently-used beams for sweeping upon detection of a beam sweeping trigger condition—Block 1740. In some examples, the base station 180 uses PTRS transmitted on each of a plurality of beams as a way to prepare the UE 184 for use of currently unused beams for both sweeping and for data transfer upon detection of a trigger.

Referring again to FIG. 19, base station sweeping component 144' includes preparing component 144f'. In some examples, preparing component 144f' prepares a plurality of the not currently-used beams for sweeping upon detection of a beam sweeping trigger condition. Accordingly, preparing component 144f' may provide means for preparing a plurality of the not currently-used beams for sweeping upon detection of a beam sweeping trigger condition.

Figure 18:
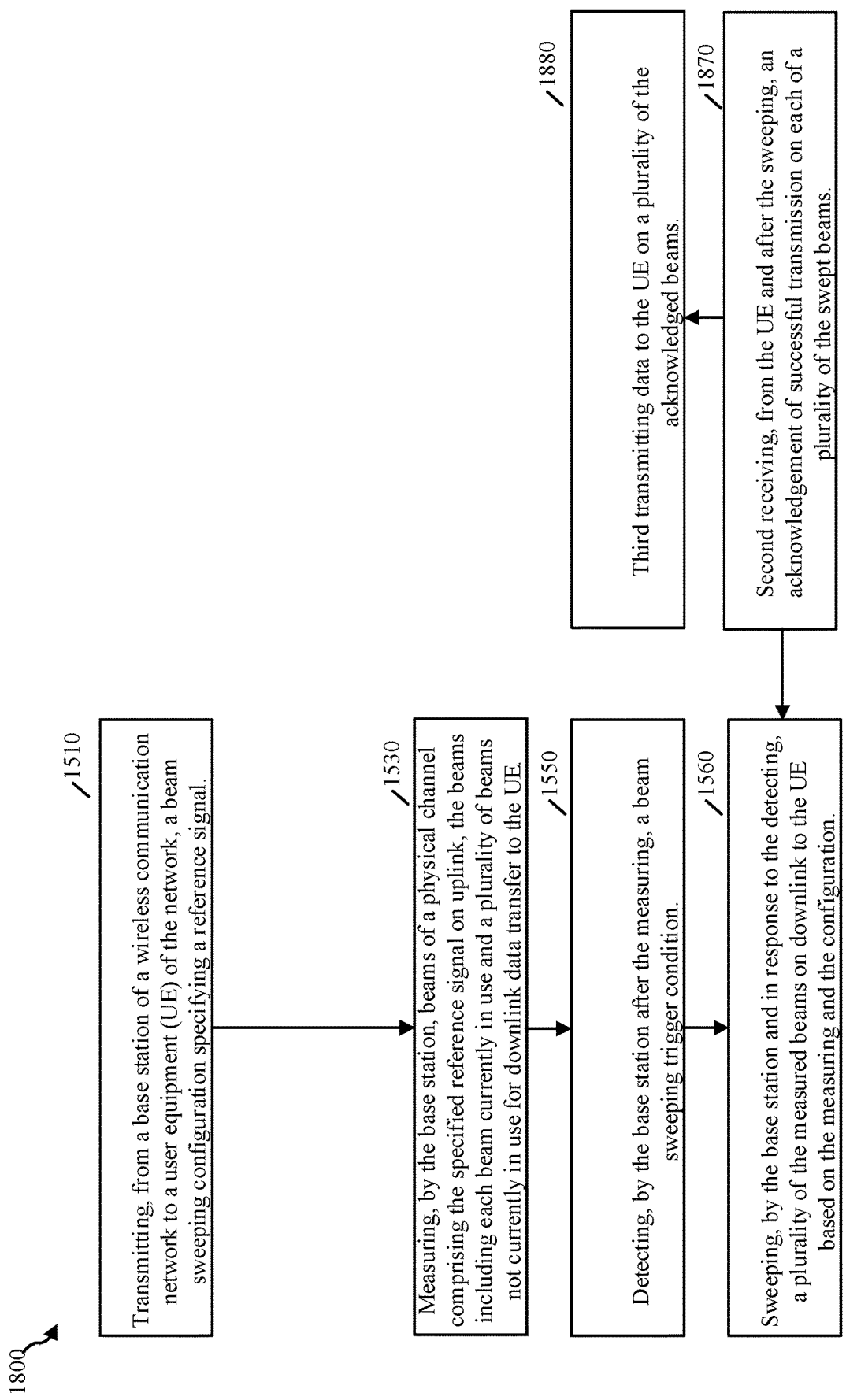
FIG. 18 is a flowchart of methods of wireless communication in accordance with examples of the technology disclosed herein.

Referring to FIG. 18, and continuing to refer to prior figures for context, a flowchart of methods 1800 of wireless communication is shown, in accordance with examples of the technology disclosed herein. In such methods 1800, Block 1510, Block 1530, Block 1550, and Block 1560 are performed as described in connection with FIG. 15. In such methods 1800 the base station 180 second receives, from the UE and after the sweeping, an acknowledgement of successful transmission on each of a plurality of the swept beams—Block 1870. In such methods 1800 the base station 180 third transmits data on one or more of the acknowledged beams—Block 1880. In the second continuing example, the UE 184, upon successfully receiving and decoding the swept signal on one or more of beams 1411f-1414f retransmits the PUSCH 1491e as PUSCH 1491g on beams 1413g and 1414g.

Referring again to FIG. 19, base station sweeping component 144' includes second receiving component 144g'. In some examples, second receiving component 144g' receives, from the UE and after the sweeping, an acknowledgement of successful transmission on each of a plurality of the swept beams. Accordingly, second receiving component 144g' may provide means for receiving, from the UE and after the sweeping, an acknowledgement of successful transmission on each of a plurality of the swept beams. Base station sweeping component 144' also includes third transmitting component 144h'. In some examples, third transmitting component 144h' transmits data on one or more of the acknowledged beams. Accordingly, third transmitting component 144h' may provide means for transmitting data on one or more of the acknowledged beams.

Figure 20:
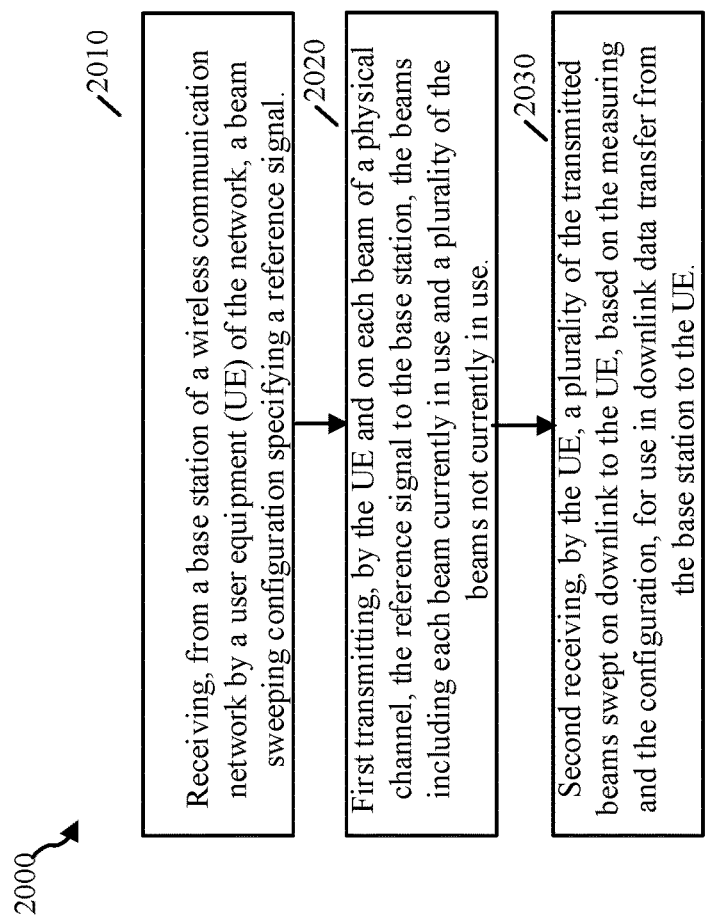
FIG. 20 is a flowchart of methods of wireless communication in accordance with examples of the technology disclosed herein.

Referring to FIG. 20, and continuing to refer to prior figures for context, a flowchart of methods 2000 of wireless communication is shown, in accordance with examples of the technology disclosed herein. In such methods, the UE 184 receives, from the base station 180, a beam sweeping configuration specifying a reference signal—Block 2010. Similar to the description of FIG. 15, but from the view of the UE 184 rather than the base station 180, in the second continuing example, the reference signal specification is carried (IEs) in a Radio Resource Control-level (RRC-level) message, specifically as part of RRCReconfiguration (RRCR) 1431b via beam 1411b on downlink. RRCR 1431b includes an SRS-Config IE modified with a beam sweeping IEs described above in a manner similar to that described in conjunction with FIG. 15 and TABLE 3. In the second continuing example, beam sweeping is enabled, and the "Origin" flag is set to "gNB Originated." K is not specified since the base station 180 trigger criteria (not receiving a single session—similar to K=1—of PUSCH when expected) does not need to be communicated to the UE 184.

Figure 25:
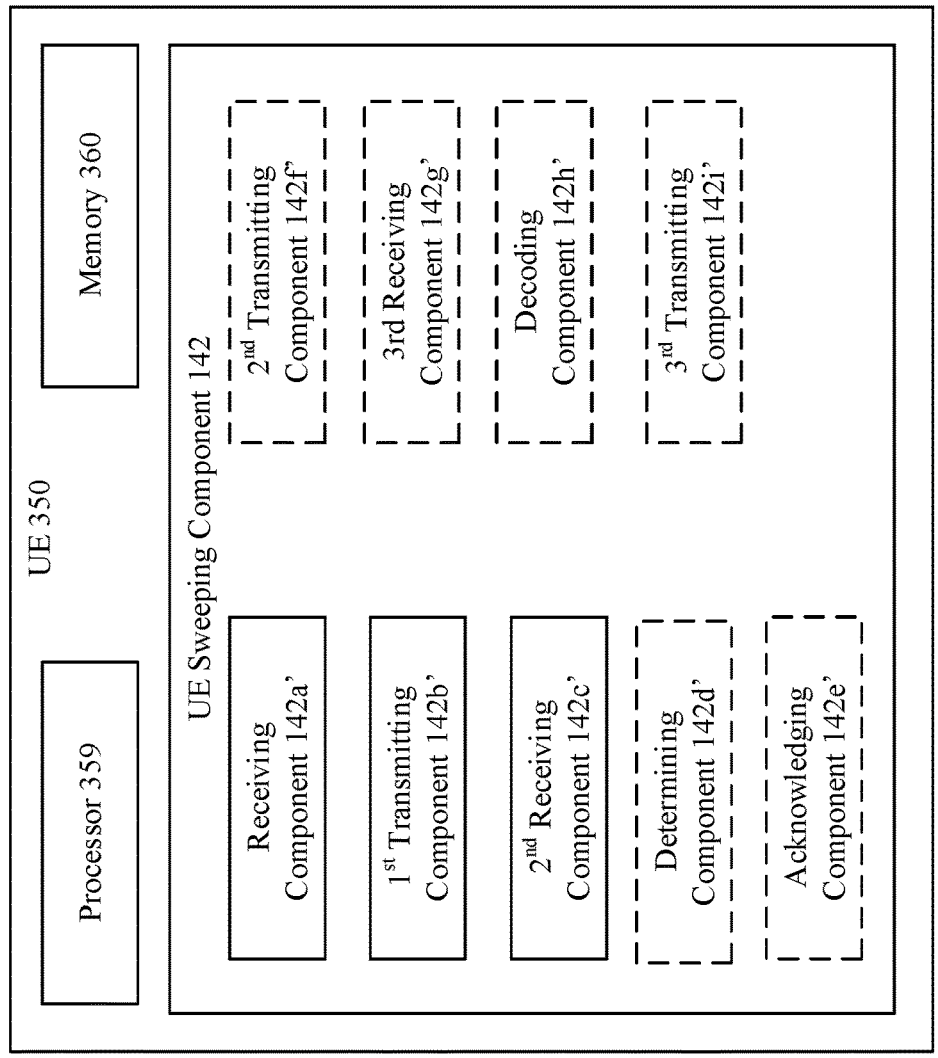
FIG. 25 is a block diagram of a UE, in accordance with examples of the technology disclosed herein.

Referring to FIG. 25, and continuing to refer to prior figures for context, a UE 350 for wireless communication disclosed herein is shown, in accordance with examples of the technology disclosed herein. UE 350 includes UE sweeping component 142' as described in conjunction with FIG. 3 above. UE sweeping component 142' includes receiving component 142a'. In some examples, receiving component 142a' receives, from the base station 180, a beam sweeping configuration specifying a reference signal. Accordingly, receiving component 142a' may provide means for receiving, from the base station 180, a beam sweeping configuration specifying a reference signal.

UE 184 first transmits, on each of a plurality of beams of a physical channel, the specified reference signal to the base station 180, the beams including each beam currently in use for data transfer between the base station 180 and the UE 184 and a plurality of the beams not currently in use for data transfer to the UE 184 from the base station 180—Block 2020. In the second continuing example, the UE 184 transmits SRS (as configures in Block 2010) swept across beams 1411c, 1412c, 1413c, 1414c, and 1415c to the base station 180. Beams 1411 and 1412 are currently in use between the UE 184 and the base station 180.

Referring again to FIG. 25, UE sweeping component 142' includes first transmitting component 142b'. In some examples, first transmitting component 142b' transmits, on each of a plurality of beams of a physical channel, the specified reference signal to the base station 180, the beams including each beam currently in use for data transfer between the base station 180 and the UE 184 and a plurality of the beams not currently in use for data transfer to the UE 184 from the base station 180. Accordingly, first transmitting component 142b' may provide means for transmitting, on each of a plurality of beams of a physical channel, the specified reference signal to the base station 180, the beams including each beam currently in use for data transfer between the base station 180 and the UE 184 and a plurality of the beams not currently in use for data transfer to the UE 184 from the base station 180.

UE 184 second receives a plurality of the transmitted beams swept on downlink to the UE 184, based on the measuring and the configuration, for use in downlink data transfer from the base station to the UE—Block 2030. In the second continuing example, In the second continuing example, the UE 184 receives five beams (1411f, 1412f, 1413f, 1414f, and 1415f) swept in order of strength. "Sweeping" in the second continuing example includes transmitting DCI 1461f on downlink on each beam in order of decreasing measure uplink power.

Referring again to FIG. 25, UE sweeping component 142' includes second receiving component 142c'. In some examples, second receiving component 142c' receives a plurality of the transmitted beams swept on downlink to the UE 184, based on the measuring and the configuration, for use in downlink data transfer from the base station to the UE. Accordingly, second receiving component 142c' may provide means for receiving a plurality of the transmitted beams swept on downlink to the UE 184, based on the measuring and the configuration, for use in downlink data transfer from the base station to the UE.

Figure 21:
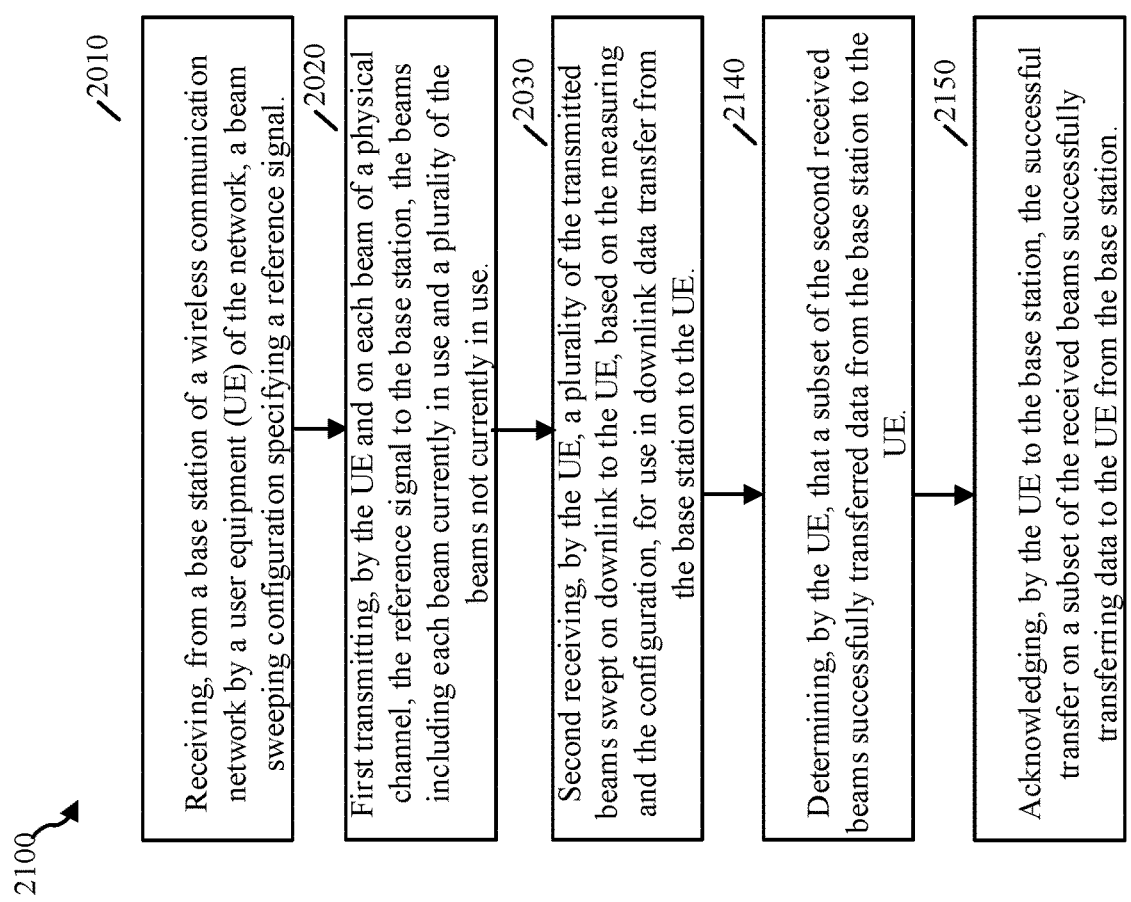
FIG. 21 is a flowchart of methods of wireless communication in accordance with examples of the technology disclosed herein.

Referring to FIG. 21, and continuing to refer to prior figures for context, a flowchart of methods 2100 of wireless communication is shown, in accordance with examples of the technology disclosed herein. In such methods 2100, Block 2010, Block 2020, and Block 2030 are performed as described in connection with FIG. 20. In such methods 2100, the UE 184 determines that a subset of the second received beams successfully transferred data from the base station 180 to the UE 184—Block 2140. The UE 184 acknowledges, to the base station 180, the successful transfer on a subset of the received beams successfully transferring data to the UE 184 from the base station 180—Block 2150. In the second continuing example, the UE 184, upon successfully receiving and decoding the swept signal on one or more of beams 1411f-1414f retransmits the PUSCH 1491e as PUSCH 1491g on beams 1413g and 1414g.

Referring again to FIG. 25, UE sweeping component 142' includes determining component 142d'. In some examples, determining component 142d' determines that a subset of the second received beams successfully transferred data from the base station 180 to the UE 184. Accordingly, determining component 142d' may provide means for determining that a subset of the second received beams successfully transferred data from the base station 180 to the UE 184. Also, UE sweeping component 142' includes acknowledgement component 142e'. In some examples, acknowledgement component 142e' acknowledges, to the base station 180, the successful transfer on a subset of the received beams successfully transferring data to the UE 184 from the base station 180. Accordingly, acknowledgement component 142e' may provide means for acknowledging, to the base station 180, the successful transfer on a subset of the received beams successfully transferring data to the UE 184 from the base station 180.

Figure 22:
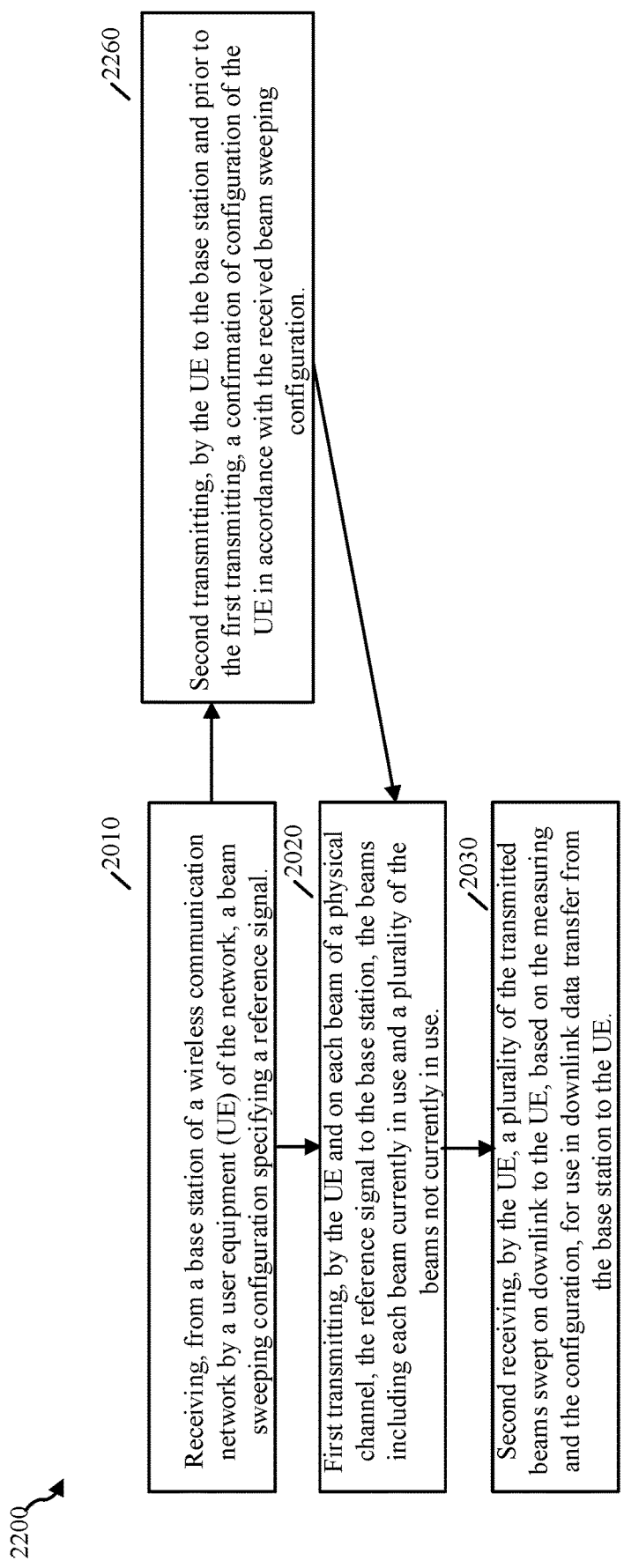
FIG. 22 is a flowchart of methods of wireless communication in accordance with examples of the technology disclosed herein.

Referring to FIG. 22, and continuing to refer to prior figures for context, a flowchart of methods 2200 of wireless communication is shown, in accordance with examples of the technology disclosed herein. In such methods 2200, Block 2010, Block 2020, and Block 2030 are performed as described in connection with FIG. 20. In such methods 2200, the UE 184 second transmits, to the base station 180 and prior to the first transmitting, a confirmation of configuration of the UE 184 in accordance with the received beam sweeping configuration—Block 2260. In the second continuing example, the UE 184 transmits RRCRConfirmation 1432b on beam 1411b in uplink confirming that the UE 184 is configured according to the RRCR 1431b sent by the base station 180 on 1411b in downlink earlier in the cycle.

Referring again to FIG. 25, UE sweeping component 142' includes second transmitting component 142f'. In some examples, second transmitting component 142f' transmits, to the base station 180 and prior to the first transmitting, a confirmation of configuration of the UE 184 in accordance with the received beam sweeping configuration. Accordingly, second transmitting component 142f' may provide means for transmitting, to the base station 180 and prior to the first transmitting, a confirmation of configuration of the UE 184 in accordance with the received beam sweeping configuration.

Figure 23:
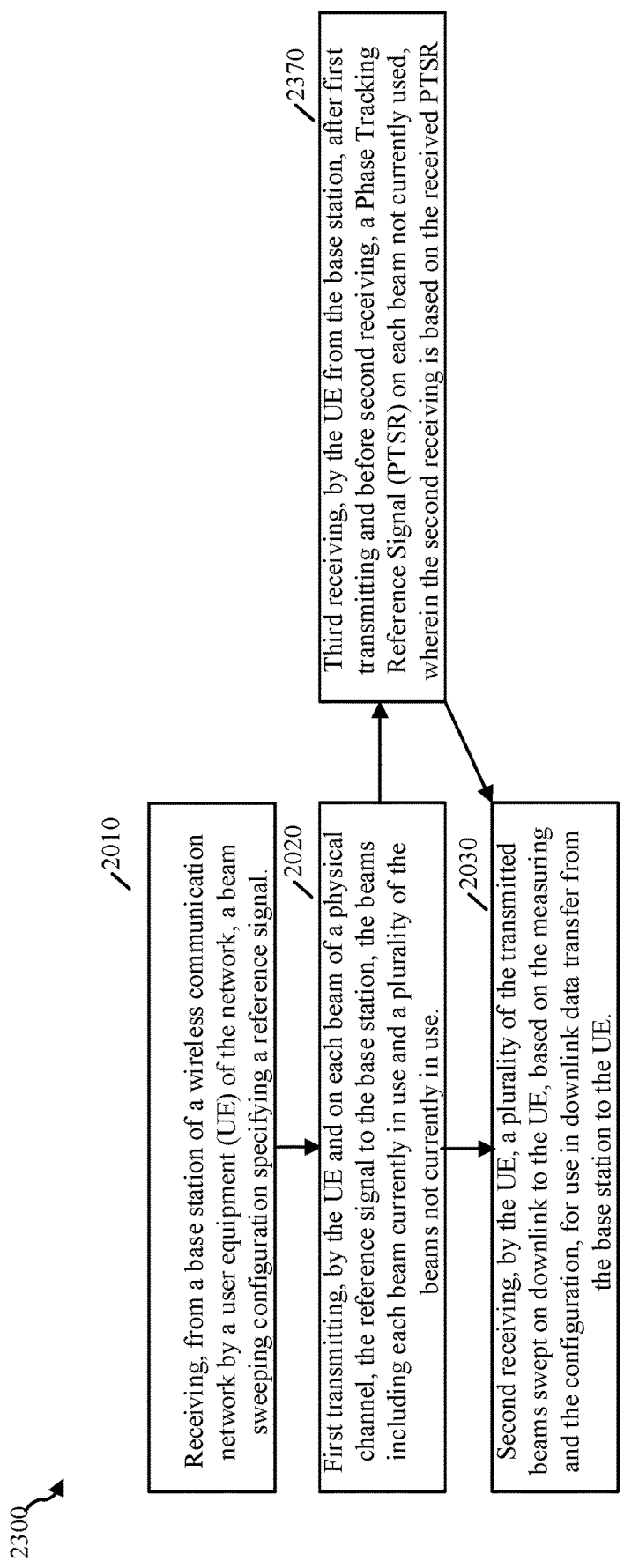
FIG. 23 is a flowchart of methods of wireless communication in accordance with examples of the technology disclosed herein.

Referring to FIG. 23, and continuing to refer to prior figures for context, a flowchart of methods 2300 of wireless communication is shown, in accordance with examples of the technology disclosed herein. In such methods 2300, Block 2010, Block 2020, and Block 2030 are performed as described in connection with FIG. 20. In such methods 2300, the UE 184 third receives, from the base station 180, after the first transmitting and before the second receiving, a Phase Tracking Reference Signal (PTRS) on each of a plurality of the beams not currently used for downlink data transfer to the UE 184, wherein the second receiving is based on the received PTRS—Block 2370. In some examples, the base station 180 uses PTRS transmitted on each of a plurality of beams as a way to prepare the UE 184 for use of currently unused beams for both sweeping and for data transfer upon detection of a trigger.

Referring again to FIG. 25, UE sweeping component 142' includes third receiving component 142g'. In some examples, third receiving component 142g' receives, from the base station 180, after the first transmitting and before the second receiving, a Phase Tracking Reference Signal (PTRS) on each of a plurality of the beams not currently used for downlink data transfer to the UE 184, wherein the second receiving is based on the received PTRS. Accordingly, third receiving component 142g' may provide means for receiving, from the base station 180, after the first transmitting and before the second receiving, a Phase Tracking Reference Signal (PTRS) on each of a plurality of the beams not currently used for downlink data transfer to the UE 184, wherein the second receiving is based on the received PTRS.

Figure 24:
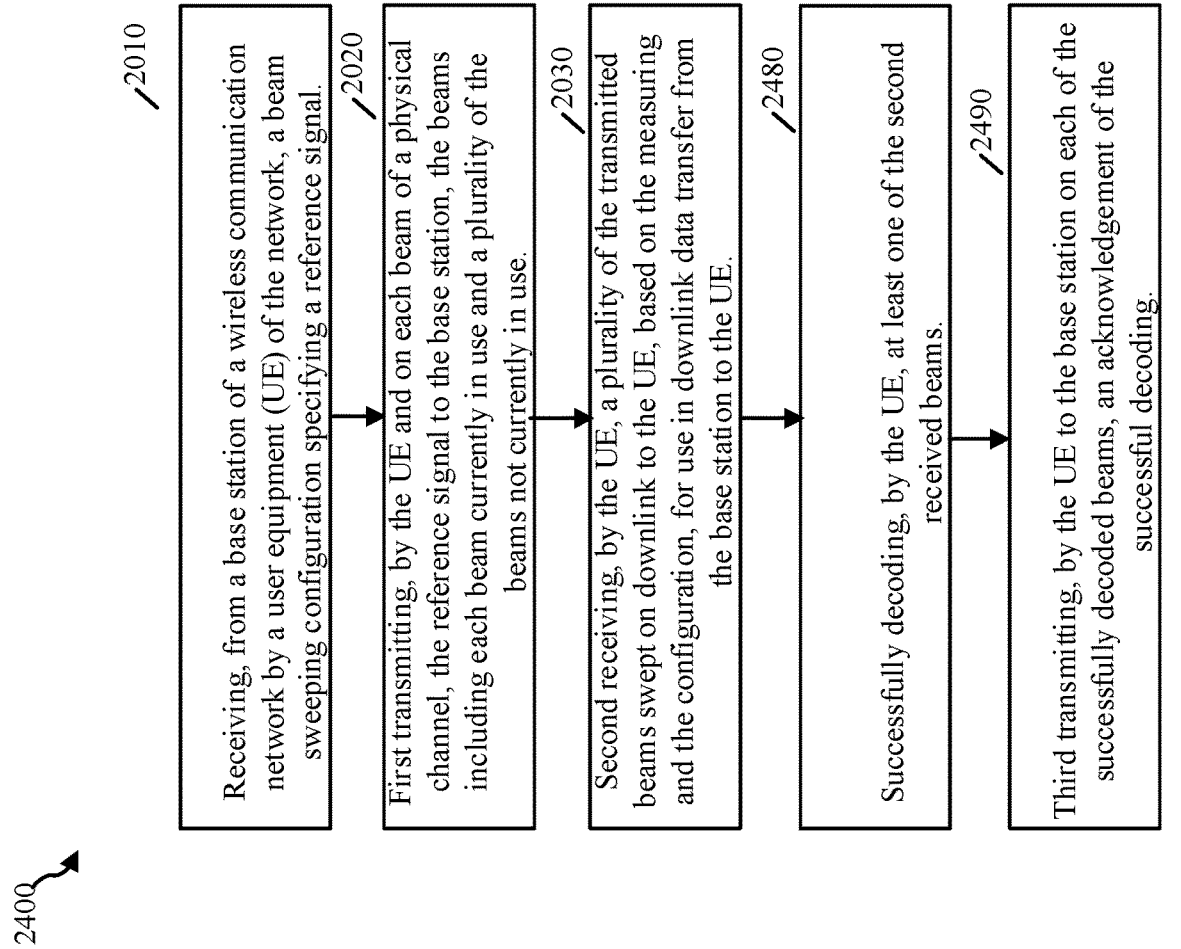
FIG. 24 is a flowchart of methods of wireless communication in accordance with examples of the technology disclosed herein.

Referring to FIG. 24, and continuing to refer to prior figures for context, a flowchart of methods 2400 of wireless communication is shown, in accordance with examples of the technology disclosed herein. In such methods 2400, Block 2010, Block 2020, and Block 2030 are performed as described in connection with FIG. 20. In such methods 2400, the UE 184 successfully decoding, by the UE, at least one of the second received beams—Block 2480. The UE 184 then third transmits, to the base station on each of the successfully decoded beams, an acknowledgement of the successful decoding—Block 2490. In the second continuing example, the UE 184, upon successfully receiving and decoding the swept signal on one or more of beams 1411f-1414f retransmits the PUSCH 1491e as PUSCH 1491g on beams 1413g and 1414g. Afterwards, and in the absence of other transmission unsuccessfully received by the base station 180, the UE 184 continues to transmit, to the base station on each of the successfully decoded beams, an acknowledgement of the successful decoding in subsequent cycles. In the second continuing example, the UE 184 transmits PUSCH 1491*h* on beams 1413*h* and 1414*h* in the next cycle.

Referring again to FIG. 25, UE sweeping component 142' includes decoding component 142*h'*. In some examples, decoding component 142*h'* decodes at least one of the second received beams. Accordingly, decoding component 142*h'* may provide means for decoding at least one of the second received beams.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other embodiments or teaching described herein, without limitation.

Example 1 is method of wireless communication, including receiving, by a user equipment (UE) of a wireless communication network, conditions for sweeping beams between a base station of the network and the UE; the conditions comprising a beam sweeping trigger rule, and a beam measurement configuration for measuring at least one characteristic of each of the beams on downlink; measuring, by the UE, at least one characteristic of each of the beams in accordance with the measurement configuration; after the measuring, detecting, by the UE a trigger in accordance with the trigger rule; and in response to detecting the trigger, sweeping, by the UE, the beams on uplink based on the measuring.

In Example 2 the method of Example 1 further includes wherein the trigger rule comprises detecting a number K of consecutive unsuccessful receptions by the UE of a downlink transmission on a physical channel carried on the beams. In Example 3 the method of Example 1 or Example 2 further includes the conditions comprising: a beam sweeping enabled/disabled flag, and a beam sweeping origin flag indicating either the UE or the base station as an origin of sweeping; and the sweeping is performed only upon: the beam sweeping enabled/disabled flag indicating beam sweeping enabled, and the beam sweeping origin flag indicating the UE as the origin of sweeping. In Example 4, the method of any of Examples 1-3 further includes the conditions comprising a time period over which the measuring remains valid; and the sweeping is performed only during the period over which the measuring remains valid. In Example 5, the method of any of Examples 1-4 further includes the conditions comprising an order for sweeping among the beams; and the sweeping is performed among the beams in the order. In Example 6, the method of any of Examples 1-5 further includes the conditions comprising a number of the beams to sweep; and the sweeping is performed among the number of the beams in the order. In Example 7 the method of any of Examples 1-6 further includes that the conditions are contained in information elements in one of a Radio Resource Control (RRC) message, a Medium Access Control-Control Element (MAC-CE) message, and a Downlink Control Information (DCI) message. In Example 8, the method of any of Examples 1-7 further includes that the conditions are contained in information elements in an RRC message of one of the types: RRCSetup, RRCReconfiguration, RRCResume, and System Information Block. In Example 9 the method of any of Examples 1-8 further includes transmitting, by the UE to the base station, the measured at least one characteristic for each of the beams; second receiving, by the UE from the base station, an acknowledgement of successful reception of the transmitted measured at least one characteristic of each of the beams; and third receiving, by the UE from the base station and after the second receiving, phase tracking reference signals on at least one of the reported beams. In Example 10 the method of any of Examples 1-9 further includes, prior to receiving the conditions, requesting, by the UE, conditions for sweeping beams of a physical channel between a base station of the network and the UE; and wherein the receiving is in response to the requesting. In Example 11 the method of any of Examples 1-10 further includes wherein each swept beam carries a Physical Uplink Control Channel (PUCCH) of the UE that includes an information element regarding the detected trigger; and the method further comprises fourth receiving, by the UE, data on one or more Physical Downlink Shared Channels (PDSCH) via one or more beams corresponding to the beams on which the information element was successfully received by the base station.

In Example 12 a method of wireless communication includes sending, by a base station of a wireless communication network to a UE of the network, conditions for sweeping beams between the UE and the base station, the conditions comprising: a beam sweeping trigger rule, and a beam measurement configuration for measuring at least one characteristic of each of the beams on downlink; transmitting, by the base station after the sending, a reference signal over the beams on downlink; first receiving, by the base station in response to the transmitting and the sending and from the UE, downlink beam measurements in accordance with the beam measurement configuration; preparing, by the base station in response to the receiving, at least one beam not currently used in downlink; second receiving, by the base station on at least one of the prepared beams swept by the UE, an indication that a trigger has been detected at the UE in accordance with the trigger rule; and second transmitting, by the base station to the UE, at least one physical channel on at least one prepared beam.

In Example 13, the method of Example 12 further includes wherein the trigger rule comprises detecting a number K of consecutive unsuccessful receptions by the UE of a downlink transmission on a physical channel carried on the beams. In Example 14 the method of any of Examples 12-13 further includes wherein: the conditions further comprise: a beam sweeping enabled/disabled flag, and a beam sweeping origin flag indicating either the UE or the base station as an origin of sweeping; wherein, the preparing is performed only upon the beam sweeping enabled/disabled flag indicating beam sweeping enabled and the beam sweeping origin flag indicating the UE as the origin of sweeping. In Example 15 the method of any of Examples 12-14 further includes wherein the conditions further comprise a time period over which the measuring remains valid; and the preparing is performed only in response to receiving measurements from the period over which the measuring remains valid. In Example 16 the method of any of Examples 12-15 further includes wherein the conditions further comprise an order for sweeping among the beams; and the preparing is performed only in response to receiving measurements among the beams in the order. In Example 17, the method of any of Examples 12-16 further includes wherein: the conditions further comprise a number of the beams to sweep; and the preparing is performed only in response to receiving measurements among the number of the beams in the order. In Example 18 the method of any of Examples 12-17 further includes wherein the conditions are contained in information elements in one of a Radio Resource Control (RRC) message, a Medium Access Control-Control Element (MAC-CE) message, and a Downlink Control Information (DCI) message. In Example 19, the method of any of Examples 12-18 further includes wherein the conditions are contained in information elements in an RRC message of one of the types: RRCSetup, RRCReconfiguration, RRCResume, and System Information Block. In Example 20 the method of any of Examples 12-19 further includes, prior to sending the conditions, third receiving, from the UE, a request for conditions for sweeping beams of a physical channel between a base station of the network and the UE; and wherein the sending is in response to the requesting. In Example 21 the method of any of Examples 12-20 further includes wherein each second received beam carries a Physical Uplink Control Channel (PUCCH) of the UE that includes an information element regarding a trigger detected in accordance with the sweeping trigger rule; and the method further comprises third transmitting, by the base station, data on one or more Physical Downlink Shared Channels (PDSCH) via one or more beams corresponding to the beams on which the information element was successfully received by the base station.

In Example 22 a method of wireless communication includes transmitting, from a base station of a wireless communication network to a user equipment (UE) of the network, a beam sweeping configuration specifying a reference signal; measuring, by the base station, at least one characteristic of each of a plurality of beams of a physical channel and comprising the specified reference signal from the UE to the base station on uplink, the beams including each beam currently in use for communication between the base station and the UE and a plurality of beams not currently in use for downlink data transfer to the UE; detecting, by the base station after the measuring, a beam sweeping trigger condition; sweeping, by the base station and in response to the detecting, a plurality of the measured beams on downlink to the UE based on the measuring and the configuration.

In Example 23, the method of Examples 22 further includes wherein the reference signal is a sounding reference signal (SRS). In Example 24, the method of any of Examples 22-23 further includes receiving, by the base station from the UE and prior to the measuring, a confirmation of configuration of the UE in accordance with the transmitted beam sweeping configuration; and wherein the measuring is performed only upon receiving the confirmation. In Example 25, the method of any of Examples 22-24 further includes wherein the beam sweeping configuration comprises a beam sweeping enabled/disabled indicator set to enabled. In Example 26 the method of any of Examples 22-25 further includes, after the measuring, preparing a plurality of the not currently-used beams for sweeping upon detection of a beam sweeping trigger condition. In Example 27, the method of any of Examples 22-26 further includes wherein the preparing includes second transmitting, by the base station, a Phase Tracking Reference Signal (PTRS) on each of a plurality of the beams not currently used for downlink data transfer to the UE. In Example 28 the method of any of Examples 22-27 further includes second receiving, from the UE and after the sweeping, an acknowledgement of successful transmission on each of a plurality of the swept beams; and third transmitting data to the UE on a plurality of the acknowledged beams. In Example 29 the method of any of Examples 22-28 further includes wherein detecting comprises determining over K consecutive communication cycles between the base station and the UE that the UE has not successfully received DL transmissions of the K consecutive cycles.

In Example 30 the method includes receiving, from a base station of a wireless communication network by a user equipment (UE) of the network, a beam sweeping configuration specifying a reference signal; first transmitting, by the UE and on each of a plurality of beams of a physical channel, the specified reference signal to the base station, the beams including each beam currently in use for data transfer between the base station and the UE and a plurality of the beams not currently in use for data transfer to the UE from the base station; and second receiving, by the UE, a plurality of the transmitted beams swept on downlink to the UE, based on the measuring and the configuration, for use in downlink data transfer from the base station to the UE.

In Example 31 the method of Example 30 includes determining, by the UE, that a subset of the second received beams successfully transferred data from the base station to the UE; and acknowledging, by the UE to the base station, the successful transfer on a subset of the received beams successfully transferring data to the UE from the base station. In Example 32, the method of any of Examples 30-31 includes wherein the reference signal is a sounding reference signal (SRS). In Example 33 the method of any of Examples 31-32 includes second transmitting, by the UE to the base station and prior to the first transmitting, a confirmation of configuration of the UE in accordance with the received beam sweeping configuration. In Example 34, the method of any of Examples 31-33 includes wherein the beam sweeping configuration comprises a beam sweeping enabled/disabled indicator set to enabled. In Example 35, the method of any of Examples 31-34 includes third receiving, by the UE from the base station, after the first transmitting and before the second receiving, a Phase Tracking Reference Signal (PTRS) on each of a plurality of the beams not currently used for downlink data transfer to the UE, wherein the second receiving is based on the received PTRS. In Example 36, the method of any of Examples 31-35 includes successfully decoding, by the UE, at least one of the second received beams; and third transmitting, by the UE to the base station on each of the successfully decoded beams, an acknowledgement of the successful decoding.

Example 37 includes an apparatus for wireless communication, comprising: a memory; and at least one processor coupled to the memory and configured to execute the method of any one or more of claims 1-36.

Example 38 includes a computer-readable medium storing computer executable code, the code when executed by a processor cause the processor to execute the method of any one or more of claims 1-36.

Example 39 includes an apparatus for wireless communications including means for receiving, by a user equipment (UE) of a wireless communication network, conditions for sweeping beams between a base station of the network and the UE, the conditions comprising: a beam sweeping trigger rule, and a beam measurement configuration for measuring at least one characteristic of each of the beams on downlink; means for measuring, by the UE, at least one characteristic of each of the beams in accordance with the measurement configuration; means for after the measuring, detecting, by the UE a trigger in accordance with the trigger rule; and means for in response to detecting the trigger, sweeping, by the UE, the beams on uplink based on the measuring.

In Example 40, the apparatus of Example 39 includes wherein the trigger rule comprises detecting a number K of consecutive unsuccessful receptions by the UE of a downlink transmission on a physical channel carried on the beams. In Example 41, the apparatus of any of Examples 39-40 includes wherein: the conditions further comprise: a beam sweeping enabled/disabled flag, and a beam sweeping origin flag indicating either the UE or the base station as an origin of sweeping; and the sweeping is performed only upon: the beam sweeping enabled/disabled flag indicating beam sweeping enabled, and the beam sweeping origin flag indicating the UE as the origin of sweeping. In Example 42, the apparatus of any of Examples 39-41 includes wherein: the conditions further comprise a time period over which the measuring remains valid; and the sweeping is performed only during the period over which the measuring remains valid. In Example 43, the apparatus of any of Examples 39-42 includes wherein: the conditions further comprise an order for sweeping among the beams; and the sweeping is performed among the beams in the order. In Example 44, the apparatus of any of Examples 39-43 includes wherein: the conditions further comprise a number of the beams to sweep; and the sweeping is performed among the number of the beams in the order. In Example 45 the apparatus of any of Examples 39-44 includes wherein the conditions are contained in information elements in one of a Radio Resource Control (RRC) message, a Medium Access Control—Control Element (MAC-CE) message, and a Downlink Control Information (DCI) message. In Example 46, the apparatus of any of Examples 39-45 includes wherein the conditions are contained in information elements in an RRC message of one of the types: RRCSetup, RRCReconfiguration, RRCResume, and System Information Block. In Example 47 the apparatus of any of Examples 39-46 includes means for transmitting, by the UE to the base station, the measured at least one characteristic for each of the beams; means for second receiving, by the UE from the base station, an acknowledgement of successful reception of the transmitted measured at least one characteristic of each of the beams; and means for third receiving, by the UE from the base station and after the second receiving, phase tracking reference signals on at least one of the reported beams. In Example 48 the apparatus of any of Examples 39-47 includes means for, prior to receiving the conditions, requesting, by the UE, conditions for sweeping beams of a physical channel between a base station of the network and the UE; and wherein the receiving is in response to the requesting. In Example 49 the apparatus of any of Examples 39-48 includes wherein each swept beam carries a Physical Uplink Control Channel (PUCCH) of the UE that includes an information element regarding the detected trigger; and the apparatus further comprises means for fourth receiving, by the UE, data on one or more Physical Downlink Shared Channels (PDSCH) via one or more beams corresponding to the beams on which the information element was successfully received by the base station.

Example 50 includes an apparatus for wireless communication, including means for sending, by a base station of a wireless communication network to a UE of the network, conditions for sweeping beams between the UE and the base station, the conditions comprising: a beam sweeping trigger rule, and a beam measurement configuration for measuring at least one characteristic of each of the beams on downlink. Example 50 further includes means for transmitting, by the base station after the sending, a reference signal over the beams on downlink; means for receiving, by the base station in response to the transmitting and the sending and from the UE, downlink beam measurements in accordance with the beam measurement configuration; means for preparing, by the base station in response to the receiving, at least one beam not currently used in downlink; means for second receiving, by the base station on at least one of the prepared beams swept by the UE, an indication that a trigger has been detected at the UE in accordance with the trigger rule; and means for second transmitting, by the base station to the UE, at least one physical channel on at least one prepared beam.

In Example 51, in the apparatus of Example 50 the trigger rule comprises detecting a number K of consecutive unsuccessful receptions by the UE of a downlink transmission on a physical channel carried on the beams. In Example 52, in the apparatus of any of Example 50-51 the conditions further comprise: a beam sweeping enabled/disabled flag, and a beam sweeping origin flag indicating either the UE or the base station as an origin of sweeping. In such examples, the preparing is performed only upon the beam sweeping enabled/disabled flag indicating beam sweeping enabled and the beam sweeping origin flag indicating the UE as the origin of sweeping. In Example 53, in the apparatus of any of Example 50-52, the conditions further comprise a time period over which the measuring remains valid; and the preparing is performed only in response to receiving measurements from the period over which the measuring remains valid. In Example 54, in the apparatus of any of Example 50-53 the conditions further comprise an order for sweeping among the beams; and the preparing is performed only in response to receiving measurements among the beams in the order. In Example 55, in the apparatus of any of Example 50-54, the conditions further comprise a number of the beams to sweep; and the preparing is performed only in response to receiving measurements among the number of the beams in the order. In Example 56, in the apparatus of any of Example 50-55, the conditions are contained in information elements in one of a Radio Resource Control (RRC) message, a Medium Access Control—Control Element (MAC-CE) message, and a Downlink Control Information (DCI) message. In Example 57, in the apparatus of any of Example 50-56, the conditions are contained in information elements in an RRC message of one of the types: RRCSetup, RRCReconfiguration, RRCResume, and System Information Block. In Example 58, the apparatus of any of Example 50-57 further includes means for third receiving, from the UE and prior to sending the conditions, a request for conditions for sweeping beams of a physical channel between a base station of the network and the UE. In such examples, the sending is in response to the requesting. In Example 59, in the apparatus of any of Example 50-58, each second received beam carries a Physical Uplink Control Channel (PUCCH) of the UE that includes an information element regarding a trigger detected in accordance with the sweeping trigger rule. Such examples further include means for third transmitting, by the base station, data on one or more Physical Downlink Shared Channels (PDSCH) via one or more beams corresponding to the beams on which the information element was successfully received by the base station.

Example 60 includes an apparatus of wireless communication, including means for transmitting, from a base station of a wireless communication network to a user equipment (UE) of the network, a beam sweeping configuration specifying a reference signal; means for measuring, by the base station, at least one characteristic of each of a plurality of beams of a physical channel, each of the beams comprising the specified reference signal, from the UE to the base station on uplink, the beams including each beam currently in use for communication between the base station and the UE and a plurality of beams not currently in use for downlink data transfer to the UE; means for detecting, by the base station after the measuring, a beam sweeping trigger condition; and means for sweeping, by the base station and in response to the detecting, a plurality of the measured beams on downlink to the UE based on the measuring and the configuration In Example 61, in the apparatus of Example 60 the reference signal is a sounding reference signal (SRS). In Example 62, any of Examples 60-61 further includes means for receiving, by the base station from the UE and prior to the measuring, a confirmation of configuration of the UE in accordance with the transmitted beam sweeping configuration. In such examples, the measuring is performed only upon receiving the confirmation. In Example 63, in the apparatus of any of Examples 60-62, the beam sweeping configuration comprises a beam sweeping enabled/disabled indicator set to enabled. In Example 64, any of Examples 60-63 further includes means for preparing, after the measuring, a plurality of the not currently-used beams for sweeping upon detection of a beam sweeping trigger condition. In Example 65, in the apparatus of any of Examples 60-64, the preparing includes second transmitting, by the base station, a Phase Tracking Reference Signal (PTRS) on each of a plurality of the beams not currently used for downlink data transfer to the UE. In Example 66, any of Examples 60-65 further includes means for receiving, from the UE and after the sweeping, an acknowledgement of successful transmission on each of a plurality of the swept beams; and means for third transmitting data to the UE on a plurality of the acknowledged beams. In Example 67, in the apparatus of any of Examples 60-66, detecting includes determining over K consecutive communication cycles between the base station and the UE that the UE has not successfully received DL transmissions of the K consecutive cycles.

Example 68 includes an apparatus for wireless communication, including means for receiving, from a base station of a wireless communication network by a user equipment (UE) of the network, a beam sweeping configuration specifying a reference signal; means for transmitting, by the UE and on each of a plurality of beams of a physical channel, the specified reference signal to the base station, the beams including each beam currently in use for data transfer between the base station and the UE and a plurality of beams not currently in use for data transfer to the UE from the base station; and means for second receiving, by the UE, a plurality of the transmitted beams swept on downlink to the UE, based on the measuring and the configuration, for use in downlink data transfer from the base station to the UE.

In Example 69, Example 68 further includes means for determining, by the UE, that a subset of the second received beams successfully transferred data from the base station to the UE; and means for acknowledging, by the UE to the base station, the successful transfer on a subset of the received beams successfully transferring data to the UE from the base station. In Example 70, in the apparatus of any of Examples 68-69, the reference signal is a sounding reference signal (SRS). In Example 71, any of Examples 68-70 further includes means for second transmitting, by the UE to the base station and prior to the first transmitting, a confirmation of configuration of the UE in accordance with the received beam sweeping configuration. In Example 72, in the apparatus of any of Examples 68-71, the beam sweeping configuration comprises a beam sweeping enabled/disabled indicator set to enabled. In Example 73, any of Examples 68-72 further includes means for third receiving, by the UE from the base station, after the first transmitting and before the second receiving, a Phase Tracking Reference Signal (PTRS) on each of a plurality of the beams not currently used for downlink data transfer to the UE, wherein the second receiving is based on the received PTRS. In Example 74, any of Examples 68-73 further includes means for successfully decoding, by the UE, at least one of the second received beams; and means for third transmitting, by the UE to the base station on each of the successfully decoded beams, an acknowledgement of the successful decoding.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method of wireless communication, comprising:
   receiving, by a user equipment (UE) of a wireless communication network, conditions for sweeping beams between a base station of the network and the UE, the conditions comprising:
   a beam sweeping trigger rule,
   a beam measurement configuration for measuring at least one characteristic of each of the beams on downlink;
   a beam sweeping enabled/disabled flag, and
   a beam sweeping origin flag indicating either the UE or the base station as an origin of sweeping;
   measuring, by the UE, at least one characteristic of each of the beams in accordance with the measurement configuration;
   after the measuring, detecting, by the UE, a trigger in accordance with the trigger rule; and
   in response to detecting the trigger, sweeping, by the UE, the beams on uplink based on the measuring, and only upon the beam sweeping enabled/disabled flag indicating beam sweeping enabled, and the beam sweeping origin flag indicating the UE as the origin of sweeping.

2. The method of claim 1, wherein the trigger rule comprises detecting a number K of consecutive unsuccessful receptions by the UE of a downlink transmission on a physical channel carried on the beams.

3. The method of claim 1, wherein:
the conditions further comprise a time period over which the measuring remains valid; and
the sweeping is performed only during the period over which the measuring remains valid.

4. The method of claim 1, wherein:
the conditions further comprise an order for sweeping among the beams and a number of the beams to sweep; and
the sweeping is performed among the number of the beams in the order.

5. The method of claim 1, wherein the conditions are contained in information elements in one: of a Radio Resource Control (RRC) message of one of RRCSetup, RRCReconfiguration, RRCResume, and System Information Block; a Medium Access Control-Control Element (MAC-CE) message; and a Downlink Control Information (DCI) message.

6. The method of claim 1, further comprising:
transmitting, by the UE to the base station, the measured at least one characteristic for each of the beams;
second receiving, by the UE from the base station, an acknowledgement of successful reception of the transmitted measured at least one characteristic of each of the beams; and
third receiving, by the UE from the base station and after the second receiving, phase tracking reference signals on at least one of the measured beams.

7. The method of claim 1:
further comprising prior to receiving the conditions, requesting, by the UE, conditions for sweeping beams of a physical channel between the base station of the network and the UE;
wherein the receiving is in response to the requesting.

8. The method of claim 1:
wherein each swept beam carries a Physical Uplink Control Channel (PUCCH) of the UE that includes an information element regarding the detected trigger; and
the method further comprises fourth receiving, by the UE, data on one or more Physical Downlink Shared Channels (PDSCH) via one or more beams corresponding to the beams on which the information element was successfully received by the base station.

9. An apparatus for wireless communication in a wireless communication network, comprising:
a memory; and
at least one processor coupled to the memory, the memory including instructions executable by the at least one processor to cause the apparatus to:
the network, conditions for sweeping beams between a base station of the network and the apparatus, the conditions comprising:
a beam sweeping trigger rule,
a beam measurement configuration for measuring at least one characteristic of each of the beams on downlink,
a beam sweeping enabled/disabled flag, and
a beam sweeping origin flag indicating either the apparatus or the base station as an origin of sweeping;
measure, by the apparatus, at least one characteristic of each of the beams in accordance with the measurement configuration;
after the measuring, detect, by the apparatus, a trigger in accordance with the trigger rule; and
in response to detecting the trigger, sweep, by the apparatus, the beams on uplink based on the measuring, and only upon the beam sweeping enabled/disabled flag indicating beam sweeping enabled, and the beam sweeping origin flag indicating the apparatus as the origin of sweeping.

10. The apparatus of claim 9, wherein the trigger rule comprises detecting a number K of consecutive unsuccessful receptions by the apparatus of a downlink transmission on a physical channel carried on the beams.

11. The apparatus of claim 9, wherein:
the conditions further comprise a time period over which the measuring remains valid; and
the sweeping is performed only during the period over which the measuring remains valid.

12. The apparatus of claim 9, wherein:
the conditions further comprise an order for sweeping among the beams and a number of the beams to sweep; and
the sweeping is performed among the number of the beams in the order.

13. The apparatus of claim 9, wherein the conditions are contained in information elements in one: of a Radio Resource Control (RRC) message of one of RRCSetup, RRCReconfiguration, RRCResume, and System Information Block; a Medium Access Control-Control Element (MAC-CE) message; and a Downlink Control Information (DCI) message.

14. A non-transitory computer-readable medium storing computer executable code, the code when executed by a processor cause the processor to:
receive, by a user equipment (UE) of a wireless communication network, conditions for sweeping beams between a base station of the network and the UE, the conditions comprising:
a beam sweeping trigger rule,
a beam measurement configuration for measuring at least one characteristic of each of the beams on downlink,
a beam sweeping enabled/disabled flag, and
a beam sweeping origin flag indicating either the UE or the base station as an origin of sweeping;
measure, by the UE, at least one characteristic of each of the beams in accordance with the measurement configuration;
after the measuring, detect, by the UE, a trigger in accordance with the trigger rule; and
in response to detecting the trigger, sweep, by the UE, the beams on uplink based on the measuring, and only upon the beam sweeping enabled/disabled flag indicating beam sweeping enabled, and the beam sweeping origin flag indicating the UE as the origin of sweeping.

15. The non-transitory computer-readable medium of claim 14, wherein the trigger rule comprises detecting a number K of consecutive unsuccessful receptions by the UE of a downlink transmission on a physical channel carried on the beams.

16. The non-transitory computer-readable medium of claim 14, wherein the code when executed by a processor further causes the processor to:
transmit, by the UE to the base station, the measured at least one characteristic for each of the beams;

second receive, by the UE from the base station, an acknowledgement of successful reception of the transmitted measured at least one characteristic of each of the beams; and third receive, by the UE from the base station and after the second receiving, phase tracking reference signals on at least one of the measured beams.

17. The non-transitory computer-readable medium of claim 14:

wherein the code when executed by a processor further causes the processor to prior to receiving the conditions, request, by the UE, conditions for sweeping beams of a physical channel between the base station of the network and the UE;

wherein the receiving is in response to the requesting.

18. The non-transitory computer-readable medium of claim 14:

wherein each swept beam carries a Physical Uplink Control Channel (PUCCH) of the UE that includes an information element regarding the detected trigger; and wherein the code when executed by a processor further causes the processor to fourth receive, by the UE, data on one or more Physical Downlink Shared Channels (PDSCH) via one or more beams corresponding to the beams on which the information element was successfully received by the base station.

19. An apparatus for wireless communications in a wireless communication network, comprising:

means for receiving, by the apparatus of the network, conditions for sweeping beams between a base station of the network and the apparatus, the conditions comprising:

a beam sweeping trigger rule, a beam measurement configuration for measuring at least one characteristic of each of the beams on downlink, a beam sweeping enabled/disabled flag, and a beam sweeping origin flag indicating either the apparatus or the base station as an origin of sweeping;

means for measuring, by the apparatus, at least one characteristic of each of the beams in accordance with the measurement configuration;

means for after the measuring, detecting, by the apparatus, a trigger in accordance with the trigger rule; and means for in response to detecting the trigger, sweeping, by the apparatus, the beams on uplink based on the measuring, and only upon the beam sweeping enabled/disabled flag indicating beam sweeping enabled, and the beam sweeping origin flag indicating the apparatus as the origin of sweeping.

20. The apparatus of claim 19, wherein the trigger rule comprises detecting a number K of consecutive unsuccessful receptions by the apparatus of a downlink transmission on a physical channel carried on the beams.

21. The apparatus of claim 19, wherein:

the conditions further comprise a time period over which the measuring remains valid; and the sweeping is performed only during the period over which the measuring remains valid.

22. The apparatus of claim 19, wherein:

the conditions further comprise an order for sweeping among the beams and a number of the beams to sweep; and the sweeping is performed among the number of the beams in the order.

23. The apparatus of claim 19, wherein the conditions are contained in information elements in one of: a Radio Resource Control (RRC) message of one of RRCSetup, RRCReconfiguration, RRCResume, and System Information Block; a Medium Access Control-Control Element (MAC-CE) message; and a Downlink Control Information (DCI) message.

24. The apparatus of claim 19, further comprising:

means for transmitting, by the apparatus to the base station, the measured at least one characteristic for each of the beams;

means for second receiving, by the apparatus from the base station, an acknowledgement of successful reception of the transmitted measured at least one characteristic of each of the beams; and means for third receiving, by the apparatus from the base station and after the second receiving, phase tracking reference signals on at least one of the measured beams.

25. The apparatus of claim 19:

further comprising means for, prior to receiving the conditions, requesting, by the apparatus, conditions for sweeping beams of a physical channel between the base station of the network and the apparatus;

wherein the receiving is in response to the requesting.

26. The apparatus of claim 19:

wherein each swept beam carries a Physical Uplink Control Channel (PUCCH) of the apparatus that includes an information element regarding the detected trigger; and the apparatus further comprises means for fourth receiving, by the apparatus, data on one or more Physical Downlink Shared Channels (PDSCH) via one or more beams corresponding to the beams on which the information element was successfully received by the base station.

* * * * *